(12) United States Patent
Sohn

(10) Patent No.: US 11,052,477 B2
(45) Date of Patent: Jul. 6, 2021

(54) SLAG REMOVAL APPARATUS

(71) Applicant: Hyeon Seung Sohn, Siheung-Si (KR)

(72) Inventor: Hyeon Seung Sohn, Siheung-Si (KR)

( * ) Notice: Subject to any disclaimer, the term of this patent is extended or adjusted under 35 U.S.C. 154(b) by 0 days.

(21) Appl. No.: 16/770,068

(22) PCT Filed: Sep. 5, 2019

(86) PCT No.: PCT/KR2019/011513
§ 371 (c)(1),
(2) Date: Jun. 4, 2020

(87) PCT Pub. No.: WO2020/050664
PCT Pub. Date: Mar. 12, 2020

(65) Prior Publication Data
US 2020/0384556 A1 Dec. 10, 2020

(30) Foreign Application Priority Data

Sep. 5, 2018 (KR) .................. 10-2018-0106098
Aug. 23, 2019 (KR) .................. 10-2019-0103489
Sep. 5, 2019 (KR) .................. 10-2019-0110283

(51) Int. Cl.
*B23K 7/06* (2006.01)
*B23D 79/10* (2006.01)
(Continued)

(52) U.S. Cl.
CPC .............. *B23D 79/10* (2013.01); *B23D 79/04* (2013.01); *B23D 79/02* (2013.01)

(58) Field of Classification Search
CPC ...... B23D 79/10; B23D 79/02; B23D 79/021; B23D 79/06
(Continued)

(56) References Cited

U.S. PATENT DOCUMENTS

| 113,611 A | * | 4/1871 | Zug | .......................... B21B 45/04 |
| | | | | 29/81.11 |
| 2,199,109 A | * | 4/1940 | Maxwell | ................ B23D 79/06 |
| | | | | 15/104.095 |

(Continued)

FOREIGN PATENT DOCUMENTS

| KR | 20020097349 B1 | 12/2002 |
| KR | 20100137939 B1 | 12/2010 |

(Continued)

*Primary Examiner* — Alvin A Hunter
(74) *Attorney, Agent, or Firm* — Renaissance IP Law Group LLP

(57) ABSTRACT

A slag removal apparatus for removing slag from support plates provided to support an object to be processed in a cutting machine is disclosed. The slag removal apparatus includes a scraper including a plurality of blades around an outer surface of a bar crossing the support plates, and a plurality of slots formed in the respective blades along a length direction and thus formed around the bar and in a length direction of the bar, a rotation support unit to which the scraper is rotatably installed, a rotation driving unit rotating the scraper from the rotation support unit to remove slag attached to the support plates by the blades, when the support plates are inserted into the slots, a lifting unit lowering the scraper, for insertion of the support plates into the slots and raising the scraper to an original position by raising and lowering the rotation support unit, and a first transfer unit moving the rotation support unit along a length direction of the support plates to allow the scraper to remove the slag along the length direction of the support plates.

23 Claims, 32 Drawing Sheets

(51) Int. Cl.
  *B23D 79/04* (2006.01)
  *B23D 79/02* (2006.01)
(58) Field of Classification Search
  USPC ........................................................ 29/81.11
  See application file for complete search history.

(56) References Cited

U.S. PATENT DOCUMENTS

| | | | | |
|---|---|---|---|---|
| 3,355,795 A * | 12/1967 | Clark | ................... | B23D 79/021 |
| | | | | 228/151 |
| 3,592,103 A * | 7/1971 | Brown | ................... | B23D 37/00 |
| | | | | 409/140 |
| 3,958,294 A * | 5/1976 | Thompson | ............... | A46B 7/02 |
| | | | | 15/198 |
| 3,959,839 A * | 6/1976 | Bradley | ................. | B23D 79/02 |
| | | | | 15/93.1 |
| 4,058,876 A * | 11/1977 | Clamans | ................ | B23D 79/04 |
| | | | | 15/236.06 |
| 4,406,029 A * | 9/1983 | Kunz | .................... | B23D 79/04 |
| | | | | 15/77 |
| 4,495,842 A * | 1/1985 | Starta | .................... | B23D 79/04 |
| | | | | 15/256.5 |
| 5,199,143 A * | 4/1993 | DeFazio | ................... | B09B 5/00 |
| | | | | 29/81.11 |
| 5,597,030 A * | 1/1997 | Lotz | ................... | B22D 11/1265 |
| | | | | 164/263 |
| 6,127,648 A * | 10/2000 | Scott | ....................... | B08B 1/008 |
| | | | | 219/121.67 |
| 6,179,532 B1 * | 1/2001 | Oldham | ................... | B23C 5/10 |
| | | | | 408/127 |
| 7,431,776 B2 * | 10/2008 | Creel, Jr. | ................. | B23K 7/10 |
| | | | | 148/194 |
| 7,971,303 B2 * | 7/2011 | Prasad | .................... | B08B 1/005 |
| | | | | 15/93.4 |
| 8,082,823 B2 * | 12/2011 | Kravitch | ................ | B08B 9/023 |
| | | | | 82/1.11 |
| 9,017,596 B2 * | 4/2015 | Bruck | .................... | B22F 10/20 |
| | | | | 266/44 |
| 9,421,651 B2 * | 8/2016 | Yang | ........................ | B23D 7/04 |
| 9,630,278 B2 * | 4/2017 | Yang | ..................... | B23D 79/02 |
| 9,643,268 B2 * | 5/2017 | Flehmig | ................. | B23D 1/26 |
| 9,687,884 B2 * | 6/2017 | Chalmers | ............... | B23K 26/38 |
| 10,625,388 B2 * | 4/2020 | Liu | ........................... | B23B 5/00 |
| 2007/0215250 A1 | 9/2007 | Creel et al. | | |

FOREIGN PATENT DOCUMENTS

| | | |
|---|---|---|
| KR | 101078547 B1 | 11/2011 |
| KR | 20130080532 A | 7/2013 |
| KR | 20130120877 B1 | 11/2013 |

* cited by examiner

SLAG REMOVAL APPARATUS

TECHNICAL FIELD

The present disclosure relates to a slag removal apparatus for removing slag from support plates in a cutting machine.

BACKGROUND ART

In general, laser processing facilitates formation of a complicated shape without deformation, enables processing of a highly hard and brittle material, reduces thermal effects, and causes less noise by non-contact.

A work table on which a laser processing object is placed is made up of a plurality of narrow and slender support plates installed vertically side by side, and concave-convex portions are repeatedly formed on these support plates such that the object point-contacts at the top of the plates. The concave-convex portions have protrusions sharply pointed upward.

However, as laser processing proceeds for the object on the work table, slag which is a foreign material melted and separated from the object adheres to the support plates and is then hardened. As the slag increases in amount, the flatness of the placed object is impaired and workability is lowered, thereby decreasing the quality and work efficiency of the laser processing.

In order to solve the problem of the conventional work table, a conventional technique of removing slag from support plates in a laser processing machine has been proposed in Korean Patent Registration No. 10-1754273 entitled "Apparatus for Removing Slag of Laser Machine Supporting Plate". The document discloses an apparatus for removing hardened slag from support plates of a table in a laser processing machine, including a frame placed on the support plates, a driver mounted on the frame and including a vertical movement portion which moves up and down, and a scraper coupled to the vertical movement portion of the driver and shutting scraping jaws, when the vertical movement portion moves upward, wherein the driver is a hydraulic cylinder, the vertical movement portion is a cylinder rod, and the scraper is coupled to a distal end of the cylinder rod and includes a pair of scraper rods coupled to each other by a hinge to relatively rotate, while crossing each other, and a cam port coupled to top ends of the scraper rods to rotate the scraper rods around a hinge axis and coupled to the cylinder rod to move up and down integrally with the cylinder rod.

However, because the support plates are processed one at a time due to the structural limitations of the scraper, the conventional technique suffers from remarkably low slag removal efficiency and requires much time and effort for the slag removal operation.

Moreover, the conventional apparatus is moved by a wire of a crane. Therefore, a number of workers are basically required to handle the conventional apparatus, making it difficult to automate slag removal.

DISCLOSURE

Technical Problem

Therefore, the present disclosure has been made in view of the above problems, and it is an object of the present disclosure to provide a slag removal apparatus with a structure improved to enable simultaneous removal of slag from a plurality of support plates.

It is another object of the present disclosure to provide a slag removal apparatus with a structure improved to provide a stable transfer path for a scraper.

It is another object of the present disclosure to provide a slag removal apparatus with a structure improved to enable automation and remote control of slag removal.

It is another object of the present disclosure to provide a slag removal apparatus with a structure improved to achieve compatibility, so that an arrangement interval between blades of a scraper may be controlled according to an arrangement interval between support plates.

Technical Solution

According to an aspect of the present disclosure, a slag removal apparatus for removing slag from support plates provided to support an object to be processed in a cutting machine includes a scraper including a plurality of blades around an outer surface of a bar crossing the support plates, and a plurality of slots formed in the respective blades along a length direction and thus formed around the bar and in a length direction of the bar, a rotation support unit to which the scraper is rotatably installed, a rotation driving unit rotating the scraper from the rotation support unit to remove slag attached to the support plates by the blades, when the support plates are inserted into the slots, a lifting unit lowering the scraper, for insertion of the support plates into the slots and raising the scraper to an original position by raising and lowering the rotation support unit, and a first transfer unit moving the rotation support unit along a length direction of the support plates to allow the scraper to remove the slag along the length direction of the support plates.

The blades may be formed to be straight in a radius direction from the bar in the scraper.

The blades may be formed to be curved in a radius direction from the bar in the scraper.

A plurality of scrapers may be arranged in parallel and installed to be rotated by the rotation driving unit, in the rotation support unit.

The blades of one of the plurality of scrapers may be formed to be straight in a radius direction from the bar, and the blades of another of the plurality of scrapers may be formed to be curved in the radius direction from the bar.

The lifting unit may include a transfer member installed to move in the length direction by the first transfer unit, a lifting guide guiding upward and downward movement of the rotation support unit to and from the transfer member, and a lifting driver raising and lowering the rotation support unit to and from the transfer member.

The first transfer unit may include a first transfer frame supporting the lifting unit, for movement of the lifting unit in the length direction, a first transfer guide guiding movement of the lifting unit along the length direction on the first transfer frame, and a first transfer driver reciprocally moving the lifting unit in the length direction on the first transfer frame.

The slag removal apparatus may further include a second transfer unit moving the rotation support unit in a transverse direction of the support plates, and the second transfer unit may include a second transfer frame supporting the first transfer unit, for movement of the first transfer unit in the transverse direction, a second transfer guide guiding movement of the first transfer unit along the transverse direction, and a second transfer driver reciprocally moving the first transfer unit in the transverse direction on the second transfer frame.

The slag removal apparatus may further include a second transfer unit moving the rotation support unit in a transverse direction of the support plates. The second transfer unit may include a second transfer frame supporting the lifting unit, for movement of the lifting unit in the transverse direction, a second transfer guide guiding movement of the lifting unit along the transverse direction on the first transfer frame, and a second transfer driver reciprocally moving the lifting unit in the transverse direction on the second transfer frame, and the first transfer unit may include a first transfer frame supporting the second transfer unit, for movement of the second transfer unit in the length direction, a first transfer guide guiding movement of the second transfer unit along the length direction on the first transfer frame, and a first transfer driver reciprocally moving the second transfer unit in the length direction on the first transfer frame.

According to another aspect of the present disclosure, a slag removal apparatus for removing slag from support plates provided to support an object to be processed in a cutting machine includes a slag removing unit including a plurality of blades disposed to allow each of the support plates to be inserted into a gap between blades belonging to the same pair, and a driving member rotating the blades to remove slag attached to the support plates by the blades, a transfer unit including a first transferrer transferring the slag removing unit in a height direction of the support plates, and a second transferrer transferring the slag removing unit in a length direction of the support plates, and a controller controlling operation of the slag removal apparatus.

The slag removal apparatus may further include a position sensing unit including a first sensor sensing a position of the slag removing unit in the length direction.

The second transferrer may transfer the first transferrer in the length direction to move the slag removing unit along with the first transferrer in the length direction, and the first sensor may include a first position sensing bar installed at a predetermined position in the first transferrer, and first position sensors installed at predetermined positions in the second transferrer, to sense a position of the slag removing unit in the length direction through the first position sensing bar.

One of the first position sensors may be installed at a predetermined operation starting point of the support plates in the length direction, and another of the first position sensors may be installed at a predetermined operation ending point of the support plates in the length direction.

When the slag removing unit reaches the operation starting point, the controller may operate the first transferrer to insert each of the support plates to a predetermined first depth in the gap between the blades, and operate the driving member to rotate the blades.

When the slag removing unit reaches the operation ending point, the controller may stop the driving member to discontinue the rotation of the blades, and operate the first transferrer to withdraw each of the support plates from the gap between the blades.

One of the first position sensors may be installed at a predetermined pass starting point, the pass starting point being spaced from an installation position of a gap maintaining plate positioned to cross the support plates toward the operation starting point by a predetermined distance, and another of the first position sensors may be installed at a predetermined pass ending point, the pass ending point being spaced from the installation position of the gap maintaining plate toward the operation ending point by a predetermined distance.

When the slag removing unit reaches the operation ending point, the controller may operate the first transferrer to insert each of the support plates to a second depth smaller than the first depth into the gap between the blades.

The second depth may be determined to space the blades from the gap maintaining member by a predetermined gap, when the blades skip the installation position of the gap maintaining member.

The support plates may be installed at a predetermined arrangement gap in the width direction, and a plurality of blades may be provided, for simultaneous insertion of each of a predetermined number of support plates among the support plates into a gap between blades belonging to different pairs.

The transfer unit may further include a third transferor transferring the slag removing unit in the width direction.

The third transferrer may transfer the second transferrer in the width direction to move the slag removing unit in the width direction along with the second transferrer, and the position sensing unit may further include a second sensor sensing a position of the slag removing unit in the width direction.

The second sensor may include a second position sensing bar installed at a predetermined position in the second transferrer, and second position sensors installed at predetermined positions in the third transferrer to sense a position of the slag removing unit in the width direction.

Each of the second position sensors may be installed at one of operation reference points defined at a gap corresponding to the sum of arrangement gaps of the predetermined number of support plates. When slag is removed from support plates corresponding to one of the operation reference points, the controller may transfer the slag removing unit to a position corresponding to another of the operation reference points by operating the third transferrer.

Advantageous Effects

The present disclosure relates to a slag removal apparatus and has the following effects.

First, because a scraper is installed to straddle across a plurality of support plates, slag attached to the plurality of support plates may simultaneously be removed along with rotation of the scraper, with the support plates inserted into a plurality of slits formed on the scraper along the length direction of the scraper. The resulting reduction of time and effort taken for the slag removal operation and stable vertical movements and motions of the scraper in predetermined paths may facilitate automation of the slag removal operation and hence increase slag removal efficiency.

Secondly, slag may simultaneously be removed from the plurality of support plates by means of the scraper including a plurality of blades.

Thirdly, a stable transfer path may be provided to the scraper by means of a transfer unit.

Fourthly, the slag removal operation may be automated and remotely controlled, using various sensors that sense the current position of the scraper and proximity of an operator and other obstacles.

Fifthly, the scraper is so configured that spacers used to control the interval between blades may be replaced with other spacers according to the interval between support plates. Accordingly, the slag removal operation may be performed with compatibility between support plates conforming to various standards.

DESCRIPTION

Reference will now be made in detail to some embodiments of the present disclosure, examples of which are illustrated in the accompanying drawings. Wherever possible, the same reference numbers will be used throughout the drawings to refer to the same or like parts. Lest it should obscure the understanding of the embodiments of the present disclosure, a description of a related known component or function will be avoided herein.

To describe the components of the embodiments of the present disclosure, the terms first, second, A, B, (a), (b), and so on may be used. These expressions are used only to distinguish one component from another component, not limiting the nature or sequence of the components. Further, unless otherwise defined, the terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings.

Figure 1:
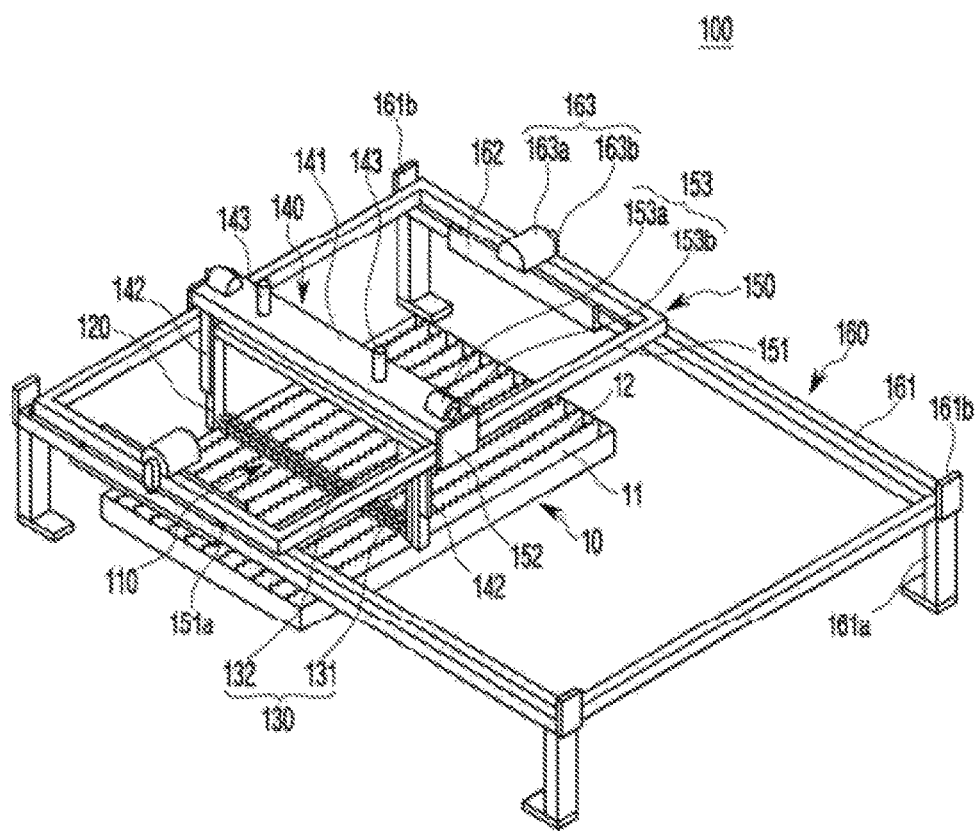
FIG. 1 is a perspective view illustrating a slag removal apparatus according to a first embodiment of the present disclosure.
Figure 2:
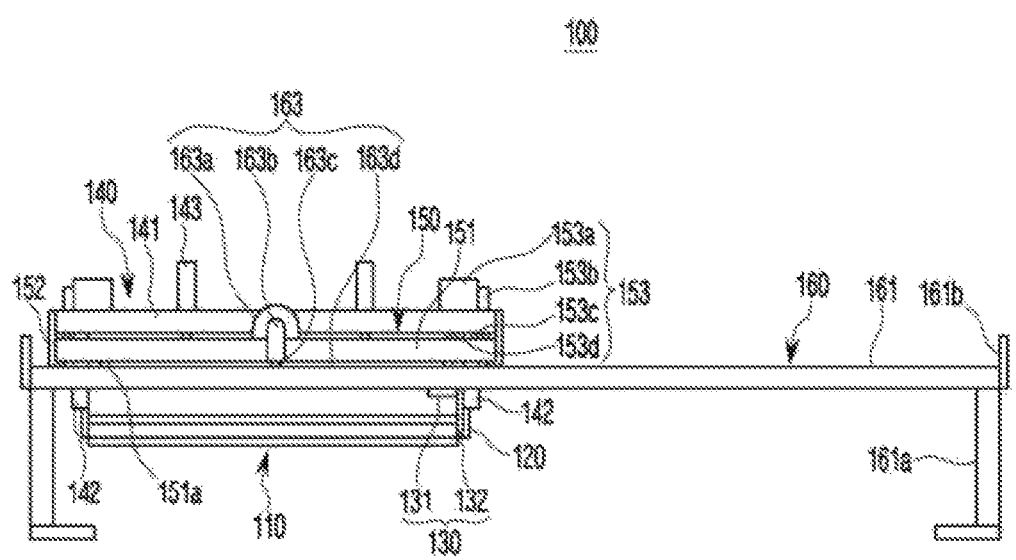
FIG. 2 is a front view illustrating the slag removal apparatus according to the first embodiment of the present disclosure.

FIG. 1 is a perspective view illustrating a slag removal apparatus according to a first embodiment of the present disclosure, and FIG. 2 is a front view illustrating the slag removal apparatus according to the first embodiment of the present disclosure.

A slag removal apparatus 100 according to the first embodiment of the present disclosure is provided to remove slag which has been generated by heating and hence melting an object to be processed and then attached to support plates 11, when a metal or any other object to be processed is cut by a laser processing machine. However, the slag removal apparatus 100 is not limited thereto and may be applied to many other cutting machines which cut a metal or any other object by heating, such as a plasma cutting machine.

Referring to FIGS. 1 and 2, the slag removal apparatus 100 according to the first embodiment of the present disclosure, which removes slag attached to the support plates 11 of the laser processing machine, may include a scraper 110, a rotation support unit 120, a rotation driving unit 130, a lifting unit 140, and a first transfer unit 150. A plurality of support plates 11 may erect vertically, arranged side by side at a position where an object to be processed is placed on a work table 10. Convex-concave portions 12 (see FIG. 7) may be formed continuously on the top ends of the support plates 11, for point-contact with the object.

Figure 3:
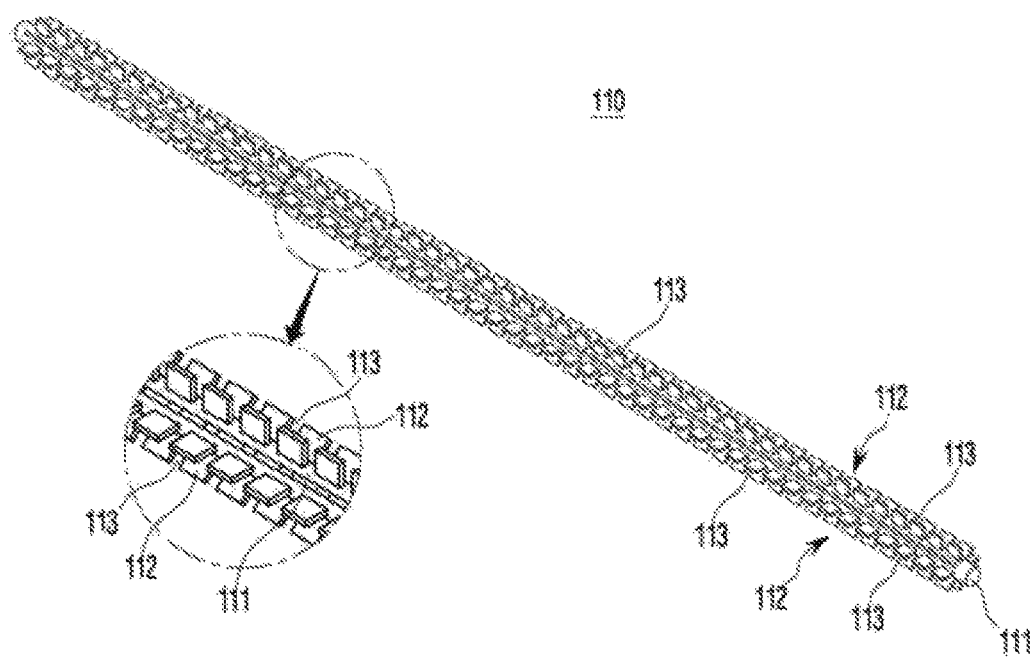
FIG. 3 is a perspective view illustrating an exemplary scraper in the slag removal apparatus according to the first embodiment of the present disclosure.
Figure 4:
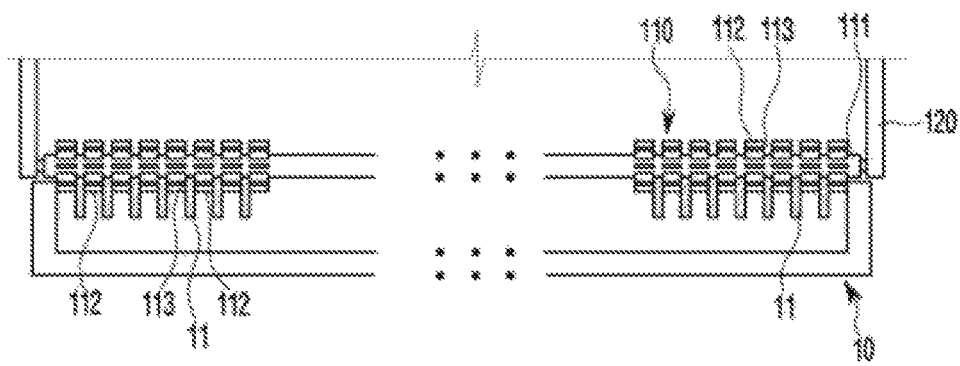
FIG. 4 is a front view illustrating an operation of the exemplary scraper in the slag removal apparatus according to the first embodiment of the present disclosure.

Referring to FIGS. 3 and 4, the scraper 110 is provided with a plurality of blades 112 around the outer surface of a bar 111 positioned to cross the support plates 11. As a plurality of slots 113 are formed in the plurality of blades 112 along the length direction, the plurality of slots 113 are provided around the bar 111 and in the length direction of the bar 111.

In the scraper 110, the plurality of blades 112 may be formed straight in a radial direction from the bar 111 as in this embodiment. Therefore, the plurality of blades 112 are favorable in securing a relatively large rotation radius, thereby contributing to widening a slag removal range.

Figure 5:
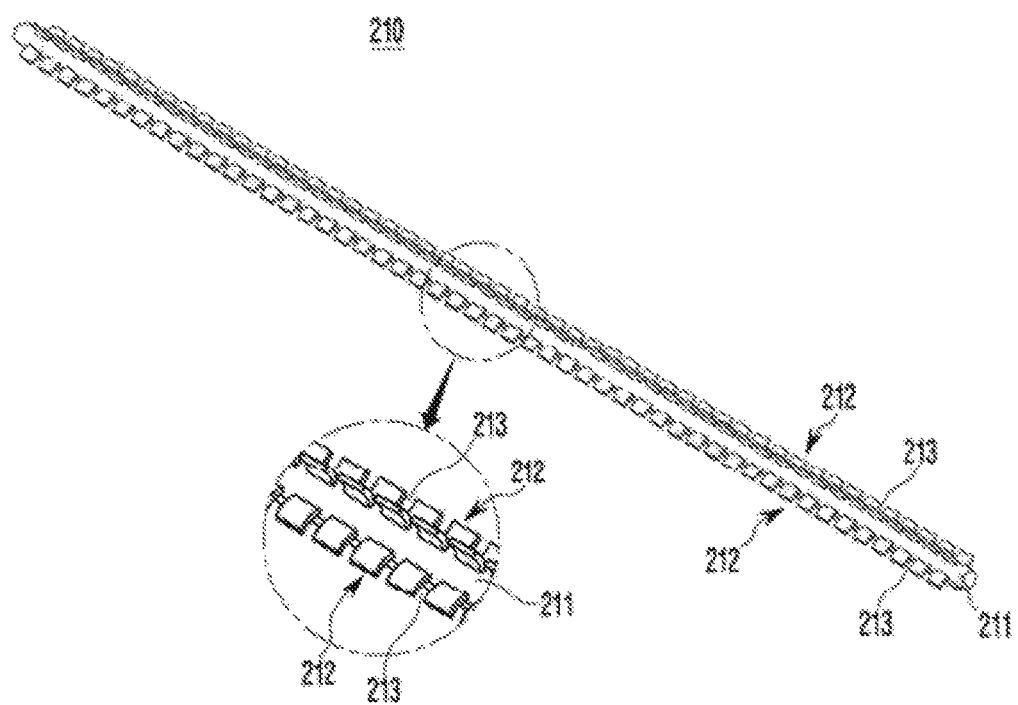
FIG. 5 is a perspective view illustrating another exemplary scraper in the slag removal apparatus according to the first embodiment of the present disclosure.

Referring to FIG. 5, blades 212 may be formed to be curved in a radial direction from a bar 211 in another exemplary scraper 210. Therefore, slag attached to the support plates 11 each being inserted between slits 213 may be smoothly removed by the blades 212 having a curvature, thereby contributing to increasing slag removal force.

Referring to FIGS. 1 and 2, the rotation support unit 120 is installed in such a manner that the scraper 110 is rotatable, and rotation shafts (not shown) provided at both ends of the bar 111 of the scraper 110 are rotatably engaged with the rotation support unit 120 through bearings. For this purpose, the rotation support unit 120 may be formed in a frame structure shaped into "⊏" or a rotational coupling structure shaped into "11" or other various shapes.

When the support plates 11 are inserted into the plurality of slots 113 of the scraper 110, the rotation driving unit 130 may rotate the scraper 110 from the rotation support unit 120 to remove slag attached to the support plates 11 by the plurality of blades 112 of the scraper 110. The rotation driving unit 130 may be installed on the rotation support unit 120 to provide rotational force to the bar 111 of the scraper 110. For example, the rotation driving unit 130 may include a rotation driving motor 131 providing rotational force and a transfer unit 132 transferring the rotational force of the rotation driving motor 131 to the rotation shafts of the bar 111. The transfer unit 132 may include various power transmission mechanisms for transferring rotational force, such as a decelerator, a plurality of gear assemblies, belts and pulleys, or a chain and a sprocket.

The lifting unit 140 may move up and down the rotation support unit 120 to lower the scraper 110 so that the support plates 11 are inserted into the respective slots of the plurality of slots 113 or to raise the scraper 110 to its original position. The lifting unit 140 may include a transfer member 141 installed to move along the length direction of the support plates 11 by the first transfer unit 150, lifting guides 142 guiding the rotation support unit 120 to move up to or move down from the transfer member 141, and lifting drivers 143 raising and lowering the rotation support unit 120 to and from the transfer member 141. To guide upward and downward movements of the rotation support unit 120, the lifting guides 142 may be configured in, for example, a frame structure vertically slidably coupled to both sides of the rotation support unit 120, as in this embodiment. In another example, the lifting guides 142 may be vertical guide shafts slidably coupled to both sides of the rotation support unit 120. In another example, the lifting guides 142 may have various sliding coupling structures including vertical LM guides. Further, the lifting drivers 143 may be cylinders operating hydraulically or pneumatically as in this embodiment, so as to move up and down the rotation support unit 120, driving means that convert rotational force of a rotation motor to a linear motion, or driving means that directly provide a linear motion, such as a linear actuator.

The first transfer unit 150 may move the rotation support unit 120 along the length direction of the support plates 11, so that the scraper 110 removes slag along the length direction of the support plates 11. The first transfer unit 150 may include, for example, a first transfer frame 151 supporting the lifting unit 140 to move along the length direction of the support plates 11, first transfer guides 152 guiding the lifting unit 140 to move on the first transfer frame 151 along the length direction of the support plates 11, and first transfer drivers 153 reciprocally moving the lifting unit 140 along the length direction on the first transfer frame 151. The first transfer frame 151 enables movement of the transfer member 141, for example, by bearings or wheels, so that the lifting unit 140 may move. The first transfer frame 151 is not limited thereto, and enables linear movement of the transfer member 141 in various manners. Various guide members such as LM guides, a lead screw and a ball screw, a sliding frame and a bearing, and so on are available for the first transfer guides 152, to guide linear reciprocal movement of the lifting unit 140, specifically the transfer member 141 in a predetermined path. Further, each of the first transfer drivers 153 may include, for example, a first transfer motor 153*a* installed to the transfer member 141 and providing driving force, a transfer unit 153*b* transferring rotational force of the first transfer motor 153*a*, such as a gear assembly, a decelerator, a belt and a pulley, or a chain and a sprocket, a pinion 153*c* installed to the transfer member 141 to be rotated by the transfer unit 153*b*, and a rack 153*d* provided in the first transfer frame along the length direction of the support plates 11, to be gear-engaged with the pinion 153*c*. In another example, various configurations enabling movement of the transfer member 141 on the first transfer frame 151 by rotational force of the rotation motor may be applied to the first driver 153. Alternatively, a linear actuator directly providing linear driving force may be used as the first drivers 153.

The slag removal apparatus 100 according to the first embodiment of the present disclosure may further include a second transfer unit 160 that moves the rotation support unit 120 to move in a transverse direction of the support plates 11. Therefore, the second transfer unit 160 enables an operation on the work table 10 too wide to be processed by moving the scraper 110 just once.

The second transfer unit 160 may include a second transfer frame 161 supporting the first transfer unit 150 to move in the transverse direction of the support plates 11, second transfer guides 162 guiding the movement of the first transfer unit 150 in the transverse direction of the support plates 11, and second transfer drivers 163 reciprocally moving the first transfer unit 150 in the transverse direction of the support plates 11. The second transfer frame 161 enables movement of the first transfer frame 151, for example, by bearings or wheels 151*a*, so that the first transfer unit 150 may move. The second transfer frame 161 is not limited thereto, and enables linear movement of the first transfer frame 151 in various manners. Various guide members such as LM guides, a lead screw and a ball screw, a sliding frame and a bearing, and so on are available for the second transfer guides 162, to guide reciprocal linear movement of the first transfer unit 150, specifically the first transfer frame 151 in a predetermined path. Further, each of the second transfer drivers 163 may include, for example, a second transfer motor 163*a* installed to the first transfer frame 151 and providing driving force, a transfer unit 163*b* transferring rotational force of the second transfer motor 163*a*, such as a gear assembly, a decelerator, a belt and a pulley, or a chain and a sprocket, a pinion 163*c* installed to the first transfer frame 151 to be rotated by the transfer unit 163*b*, and a rack 163*d* provided in the second transfer frame 161 along the transverse direction of the support plates 11, to be gear-engaged with the pinion 163*c*. Various configurations enabling movement of the first transfer frame 151 on the second transfer frame 161 by rotational force of the rotation motor may be applied to the second drivers 163. Alternatively, a linear actuator directly providing linear driving force may be used as the second drivers 163.

Unlike this embodiment, the first transfer unit moving the rotation support unit 120 along the length direction of the support plates 11 and the second transfer unit moving the rotation support unit 120 along the transverse direction of the support plates 11 may be installed in a different order. That is, the second transfer unit may be configured to move the rotation support unit 120 along the transverse direction of the support plates 11, and the first transfer unit may be configured to move the rotation support unit 120 along the length direction of the support plates 11, along with the second transfer unit. For this purposes, for example, the second transfer unit may include the second transfer frame supporting the lifting unit 140 to move in the transverse direction, the second transfer guides guiding the movement of the lifting unit 140 in the transverse direction on the first transfer frame, and the second transfer drivers reciprocally moving the lifting unit 140 in the transverse direction on the second transfer frame. Further, the first transfer unit may include the first transfer frame supporting the second transfer unit to move in the length direction, the first transfer guides guiding the movement of the second transfer unit in the length direction on the first transfer frame, and the first transfer drivers reciprocally moving the second transfer unit in the length direction on the first transfer frame. Components with the same names as in the foregoing embodiment may be configured in correspondence with their counterparts in the foregoing embodiment, and thus will not be described herein to avoid redundancy.

Figure 6:
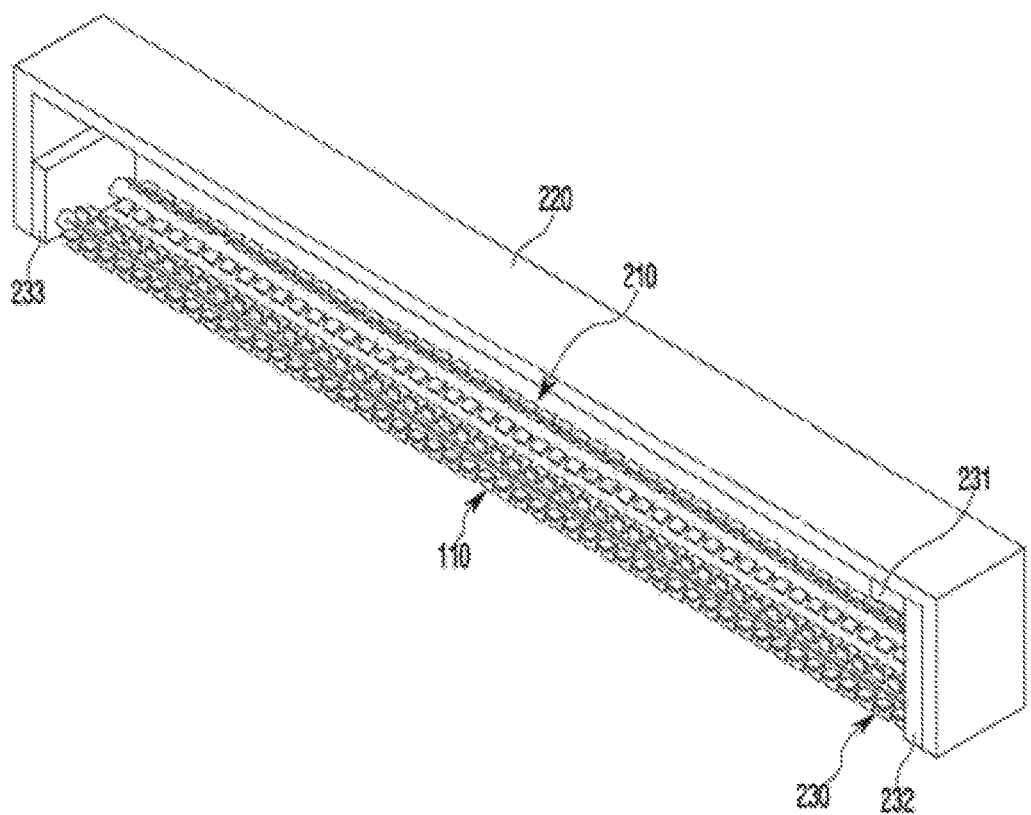
FIG. 6 is a perspective view illustrating scrapers and a rotation driving unit in a slag removal apparatus according to a second embodiment of the present disclosure.
Figure 7:
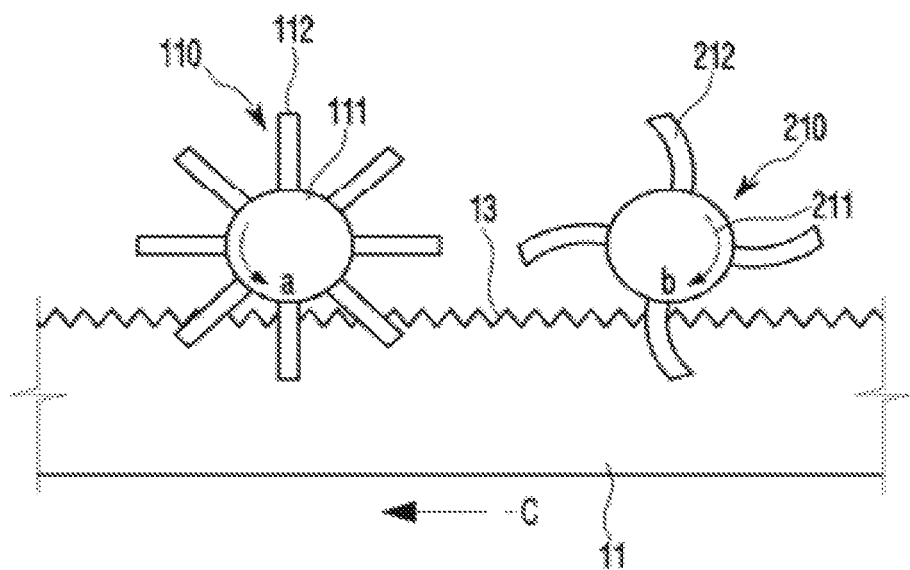
FIG. 7 is a side view illustrating operations of the scrapers and the rotation driving unit in the slag removal apparatus according to the second embodiment of the present disclosure.

FIG. 6 is a perspective view illustrating scrapers and a rotation driving unit in a slag removal apparatus according to a second embodiment of the present disclosure, and FIG. 7 is a side view illustrating operations of the scrapers and the rotation driving unit in the slag removal apparatus according to the second embodiment of the present disclosure.

Referring to FIGS. 6 and 7, a plurality of scrapers 110 and 210 may be arranged in parallel to be rotated by a rotation driving unit 230, in a rotation support unit 220 in the slag removal apparatus according to the second embodiment of the present disclosure.

As illustrated in FIGS. 3 and 5, the blades 112 of one of the scrapers 110 and 210 may be formed to erect straight in the radius direction from the bar 111, whereas the blades 212 of the other scraper 210 may be formed to be curved in the radius direction from the bar 211. The rotation driving unit 230 may include as many drivers as the number of scrapers 110 and 210 to rotate the scrapers 110 and 210, respectively, which should not be construed as limiting the present disclosure. Instead, the rotation driving unit 230 may include a single driver configured to transfer driving force to each of the scrapers 110 and 210. Further, while the scrapers 110 and 210 are shown in FIG. 7 as rotating in directions a and b, respectively by a linear motion C with respect to the support plates 11, this is merely an example. Needless to say, the scrapers 110 and 210 may be rotated in a different manner.

The rotation driving unit 230 may include, for example, one or more rotation driving motors 231 providing rotational force, and a transfer unit 232 transferring rotation force of the one or more rotation driving motors 231 to rotation shafts of the scrapers 110 and 210. Further, an interworking unit 233 may be included, which couples the scrapers 110 and 210 to each other by gears or chains of a predetermined gear ratio so that the scrapers 110 and 210 maintain their predetermined numbers of revolutions. When there is a single rotation driving motor of the one or more rotation driving motors 231, the transfer unit 232 may transfer the rotational force of the single rotation driving motor of the one or more rotation driving motors 231 distributedly to the rotation shafts of the scrapers 110 and 210 by means of a gear assembly, a belt and a pulley, or a chain and a sprocket. When there are a plurality of the one or more rotation driving motors 231, the transfer unit 232 may transfer the rotational force of the one or more the rotation driving motors 231 to the respective rotation shafts of the scrapers 110 and 210 by means of a gear assembly, a belt and a pulley, or a chain and a sprocket.

In the slag removal apparatus 100 according to the first and second embodiments of the present disclosure, a scraper is installed to straddle across a plurality of support plates. Therefore, with the support plates inserted into a plurality of slits formed on the scraper along a length direction, slag may be removed simultaneously from the plurality of support plates by rotation of the scraper, thereby reducing time and effort taken to remove slag.

Further, in the slag removal apparatus 100 according to the first and second embodiments of the present disclosure, as the scraper stably moves up and down and makes a linear motion in predetermined paths, a slag removal operation may be automated easily and hence the efficiency of the slag removal operation may be increased.

Figure 8:
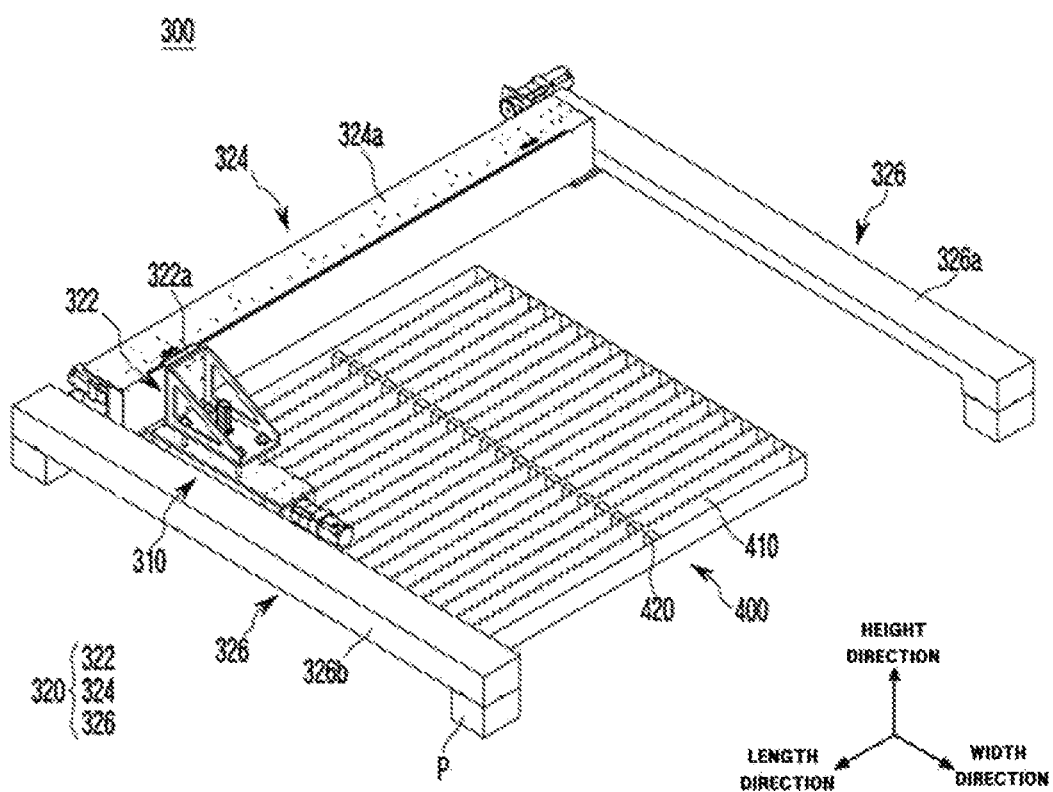
FIG. 8 is a perspective view illustrating a schematic structure of a slag removal apparatus according to a third embodiment of the present disclosure.
Figure 9:
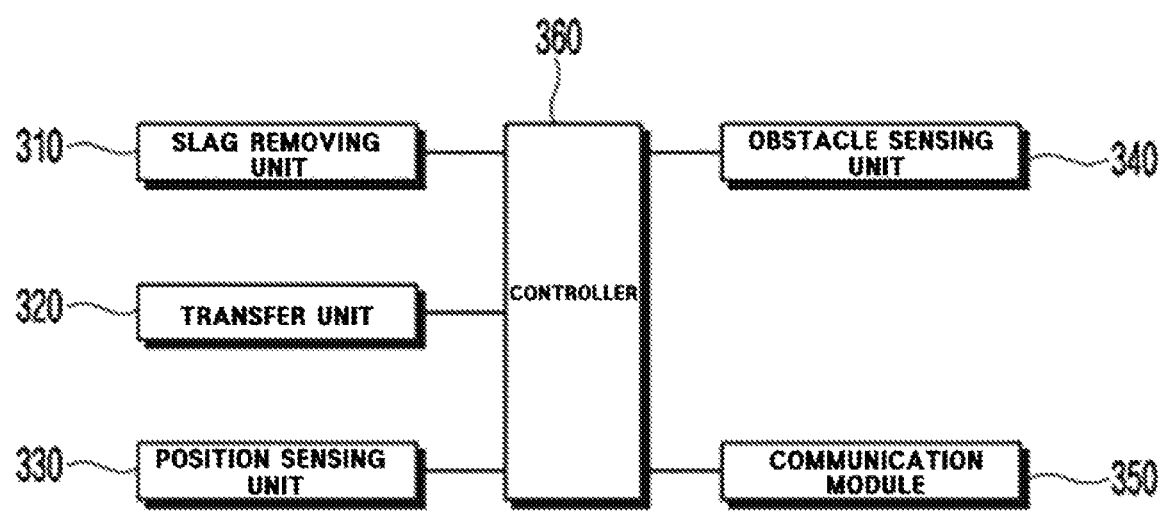
FIG. 9 is a block diagram illustrating a control mechanism in the slag removal apparatus illustrated in FIG. 8.

FIG. 8 is a perspective view illustrating a schematic structure of a slag removal apparatus according to a third embodiment of the present disclosure, and FIG. 9 is a block diagram illustrating a control mechanism of the slag removal apparatus illustrated in FIG. 8.

A slag removal apparatus 300 according to the third embodiment of the present disclosure is provided to remove slag which has been generated by heating and melting a metal or any other object to be processed and attached to a plurality of support plates 410, when the metal or object is cut by a laser processing machine. However, the slag removal apparatus 300 is not limited thereto, and may be applied to various cutting machines operating by thermally cutting a metal or any other object to be processed, such as a plasma cutting machine.

Referring to FIGS. 8 and 9, the slag removal apparatus 300 may include a slag removing unit 310 that simultaneously removes slag attached to a plurality of support plates 410, a transfer unit 320 that transfers the slag removing unit 310 in a predetermined direction, a position sensing unit 330 that senses the position of the slag removing unit 310, an obstacle sensing unit 340 that senses an obstacle approaching the slag removal apparatus 300, a communication module 350 that conducts wired/wireless communication, and a controller 360 that provides overall control to the slag removal apparatus 300.

As illustrated in FIG. 8, the slag removal apparatus 300 is placed such that a support plate assembly 400 of a cutting machine is positioned in a predetermined work area. For this purpose, pillars P may be installed under housings 322a, 324a, 326a, and 326b of the transfer unit 320 in order to space the slag removal apparatus 300 apart from the ground by a predetermined height.

As illustrated in FIG. 8, the support plate assembly 400 may include a plurality of support plates 410 arranged apart from each other by a predetermined gap along a width direction, and one or more gap maintaining plates 420 crossing the plurality of support plates 410 to keep the plurality of support plates 410 apart from each other by the predetermined gap. In general, the gap maintaining plates 420 are lower than the plurality of support plates 410 by a predetermined height. When the support plate assembly 400 is provided in this manner, a plurality of blades 316 of a later-described scraper 311 may be arranged in parallel to the direction in which the support plates plurality of 410 are arranged in the slag removal apparatus 300.

Figure 10:
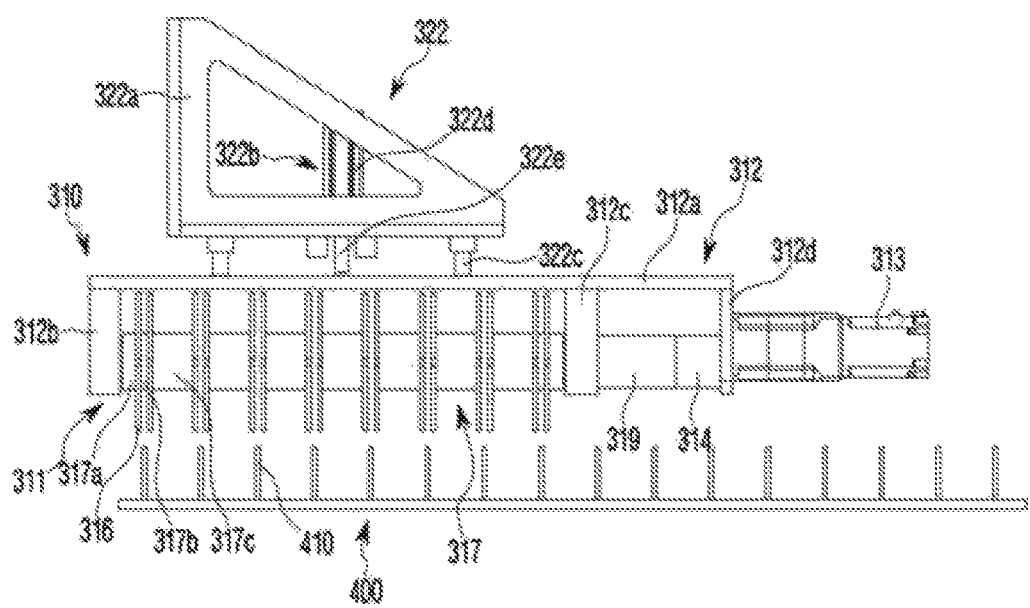
FIG. 10 is a front view illustrating the schematic structure of a slag removing unit illustrated in FIG. 8.
Figure 11:
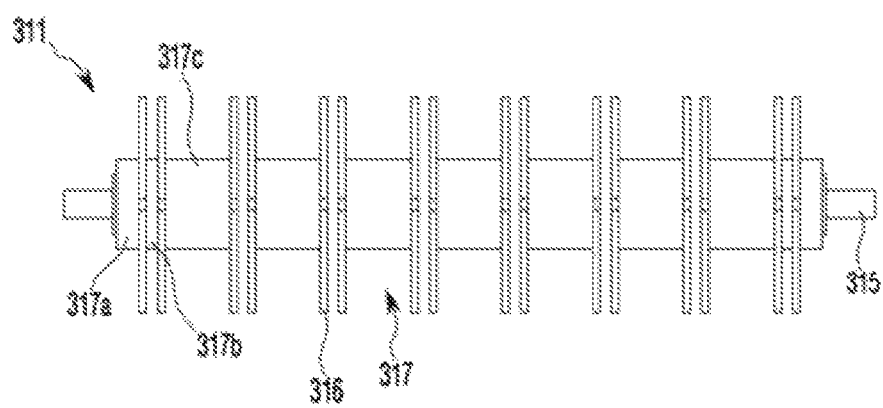
FIG. 11 is a front view illustrating a scraper illustrated in FIG. 10.
Figure 12:
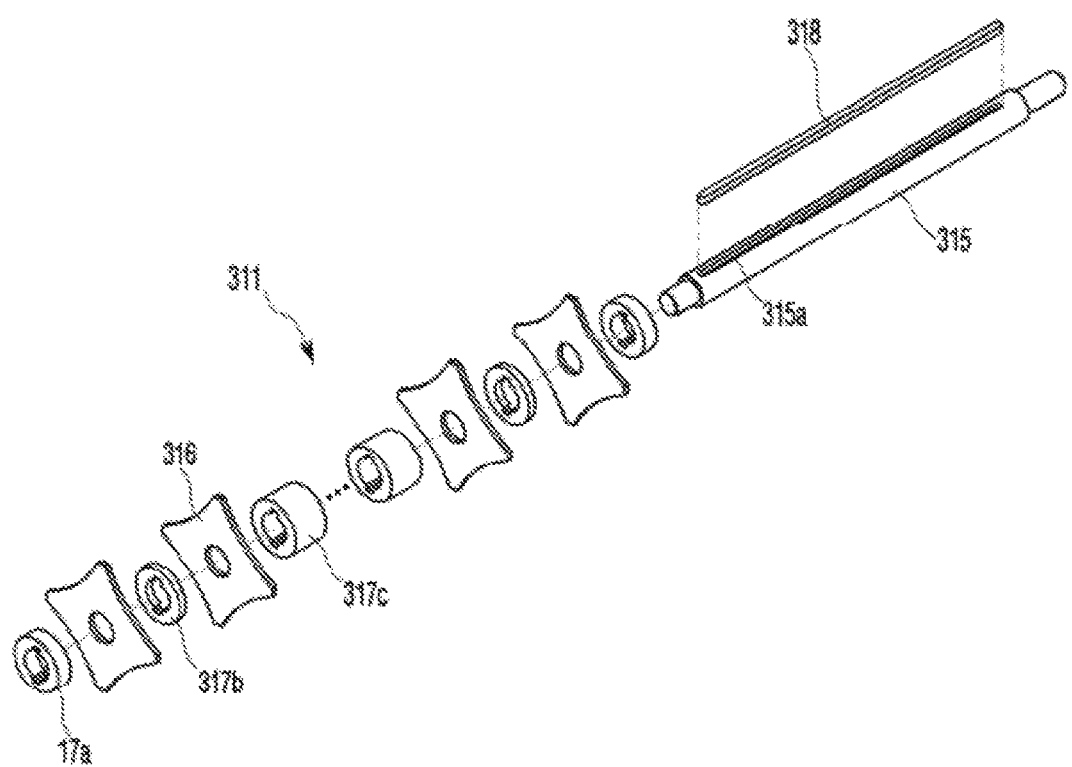
FIG. 12 is an exploded perspective view illustrating the scraper illustrated in FIG. 11.

FIG. 10 is a front view illustrating a schematic structure of the slag removing unit illustrated in FIG. 8, FIG. 11 is a front view illustrating the scraper illustrated in FIG. 10, and FIG. 12 is an exploded perspective view illustrating the scraper illustrated in FIG. 11.

Figure 13:
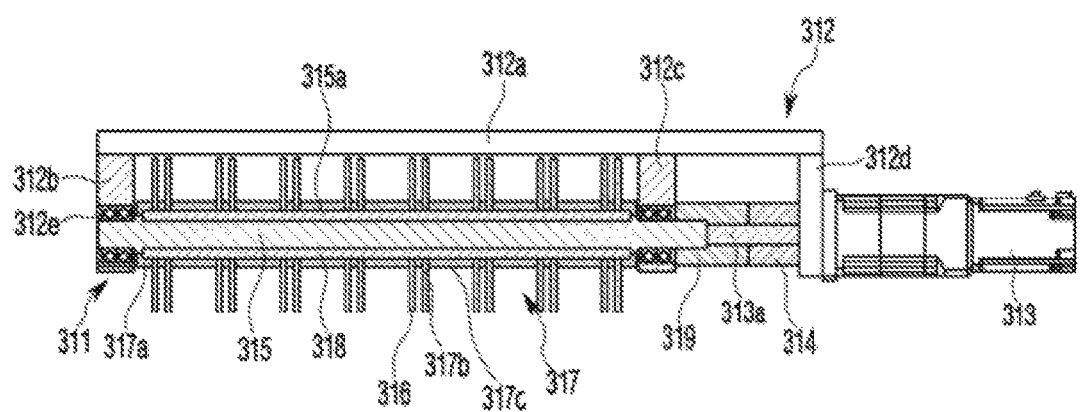
FIG. 13 is a partially cut sectional view illustrating the slag removing unit illustrated in FIG. 10.
Figure 14:
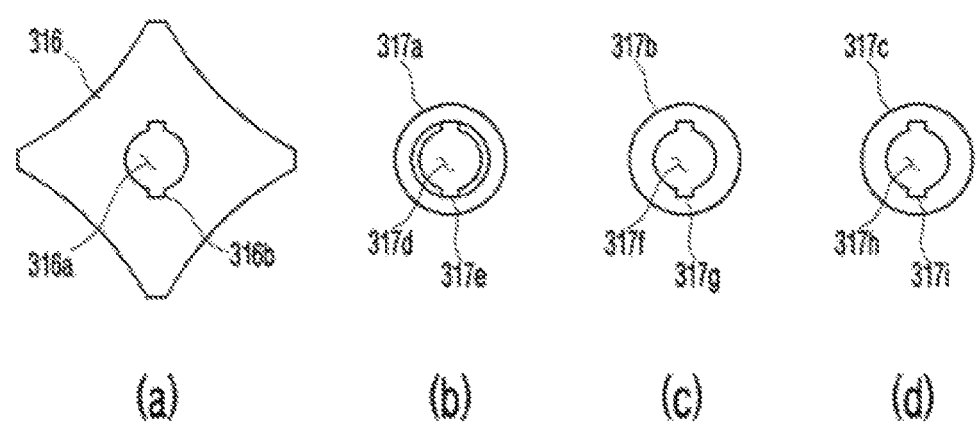
FIG. 14 is a front view illustrating a blade and spacers illustrated in FIG. 10.
Figure 15:
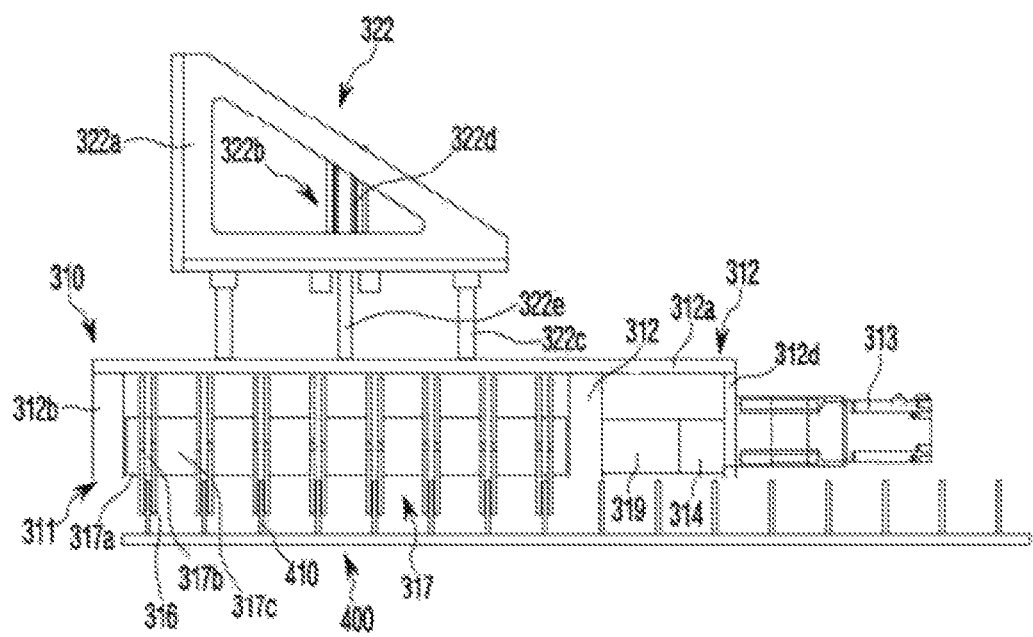
FIG. 15 is a diagram illustrating support plates each inserted between blades.

Further, FIG. 13 is a partially cut sectional view illustrating the slag removing unit illustrated in FIG. 10, FIG. 14 is a front view illustrating a blade and spacers illustrated in FIG. 10, and FIG. 15 is a diagram illustrating insertion of each of the support plates between blades.

As illustrated in FIG. 10, the slag removing unit 310 may include the scraper 311 removing slag attached to the plurality of support plates 410, a support frame 312 supporting the scraper 311, a driving member 313 driving the scraper 311 to rotate, and a torque sensor 314 sensing rotational load applied to the scraper 311 and/or the driving member 313 during slag removal.

As illustrated in FIGS. 11 and 12, the scraper 311 may include a shaft 315, a plurality of blades 316 axially engaged with the shaft 315, spacers 317 axially engaged with the shaft 315 to maintain an installation gap between the plurality of blades 316, and engagement keys 318 fastening the plurality of blades 316 and the spacers 317 to the shaft 315 to rotate the plurality of blades 316 and the spacers 317 along the shaft 315.

As illustrated in FIGS. 12 and 13, one or more key grooves 315a may be formed on the outer circumferential surface of the shaft 315, so that the engagement keys 318 may be inserted into the key grooves 315a.

The plurality of blades 316 are not limited to any particular shape. That is, the plurality of blades 316 may be formed into any of various shapes, as far as they scrape slag away from both surfaces of each of the plurality of support plates 410 when the plurality of blades 316 are rotated by the driving member 313. As illustrated in FIG. 14(a), each of the plurality of blades 316 may include an insertion hole 316a into which the shaft 315 is inserted, and key grooves 316b into which the engagement keys 318 engaged in the key grooves 315a of the shaft 315 are inserted.

The number of these plurality of blades 316 is not limited to any particular value. A plurality of blades 316 may be installed to simultaneously remove slag from a predetermined number of the plurality of support plates 419 among the total of the plurality of support plates 410. That is, a plurality of blades 316 may be installed such that each of the predetermined number of the plurality of support plates 410 may be inserted between blades belonging to different pairs of the plurality of blades 316.

As illustrated in FIGS. 14(b), 14(c), and 14(d), each of the spacers 317 may include an insertion hole 317d, 317f, or 317h into which the shaft 315 is inserted, and key grooves 317e, 317g, or 317i through which the engagement keys 318 engaged with the key grooves 315a of the shaft 315 are inserted. The spacers 317 may be formed into various shapes. For example, there may be first spacers 317a closing both ends of the shaft 315, second spacers 317b each spacing a pair of adjacent blades of the plurality of blades 316 apart from each other by a gap corresponding to the width of a support plate of the plurality of support plates 410, and third spacers 317c each spacing blades of the plurality of blades 316 belonging to different pairs from each other by a gap corresponding to the arrangement gap between support plates of the plurality of support plates 410.

As illustrated in FIG. 10, the first spacers 317a are disposed on both ends of the shaft 315 to prevent slip-off of outermost blades of the plurality of blades 316 on both sides of the shaft 315 from the shaft 315.

As illustrated in FIG. 10, each of the second spacers 317b has a width equal to the width of a support plate of the plurality of support plates 410 or a predetermined ratio to the width of the support plate of the plurality of support plates 410. As illustrated in FIG. 11, each of the second spacers 317b is interposed between a pair of blades of the plurality of blades 316. Then, one of the support plates of the plurality of support plates 410 may be inserted between the pair of blades of the plurality of blades 316, as illustrated in FIG. 15.

As illustrated in FIG. 15, when the blades 316 are mounted on the plurality of support plates 410, a pair of blades 316 are disposed between every pair of adjacent support plates of the plurality of support plates 410. Thus, each of the third spacers 317c has a width corresponding to a value calculated by subtracting the widths of a pair of blades of the plurality of blades 316 from the arrangement gap between a pair of adjacent support plates of the plurality of support plates 410. As illustrated in FIG. 11, each of the third spacers 317c is interposed between blades of the plurality of blades 316 belonging to different pairs. Therefore, each of the third spacers 317c may maintain a constant gap between blades of the plurality of blades 316 belonging to different pairs so that each blade of the plurality of blades 316 is brought into close contact with one side surface of a support plate of the plurality of support plates 410, as illustrated in FIG. 15.

As illustrated in FIG. 13, the engagement keys 318 are formed into shapes corresponding to those of the key grooves 315a, 316b, 317e, 317g, and 317i to be inserted into the key grooves 315a, 316b, 317e, 317g, and 317i of the shaft 315, the plurality of blades 316, and the spacers 317. Further, as illustrated in FIG. 13, when the engagement keys 318 are engaged in the key grooves 315a of the shaft 315, the engagement keys 318 protrude outward from the shaft 315 by predetermined lengths.

As many engagement keys 318 as the number of key grooves 315a of the shaft 315 may be provided, so that each of the engagement keys 318 is inserted into one of the key grooves 315a. With the engagement keys 318 inserted into the key grooves 315a of the shaft 315, the plurality of blades 316 and the spacers 317 may be sequentially engaged axially with the shaft 315 in a predetermined order so that the parts of the engagement keys 318 protruding outward from the shaft 315 may be inserted into the key grooves 315a, 316b, 317e, 317g, and 317i of the plurality of blades 316 and the spacers 317. Then, as the plurality of blades 316 and the spacers 317 are fastened around the shaft 315 by the engagement keys 318, they may be kept at their arrangement positions and driven to rotate along the shaft 315 during driving of the driving member 313. Therefore, the scraper 311 may be configured, in which the plurality of blades 316 are arranged according to the width and arrangement gap of the plurality of support plates 410.

As illustrated in FIG. 13, the scraper 311 having the above-described structure is installed such that both ends of the shaft 315 are rotatably supported by rotation support plates 312b and 312c of the support frame 312, respectively. A bearing or a rotation support member 312e supporting rotation of the shaft 315 may be installed to each of the rotation support plates 312b and 312c. Further, one of both ends of the shaft 315 may penetrate through the rotation support plate 312c and be axially engaged with a rotation shaft of the driving member 313 by means of a coupler 319. Thus, when the driving member 313 rotates, driving force output from the driving member 313 may be transferred to the plurality of blades 316 through the shaft 315 and the engagement keys 318. Accordingly, the plurality of blades 316 may be driven to rotate by the driving force from the driving member 313 and remove slag attached to the plurality of support plates 410 by scraping out the slag.

Figure 16:
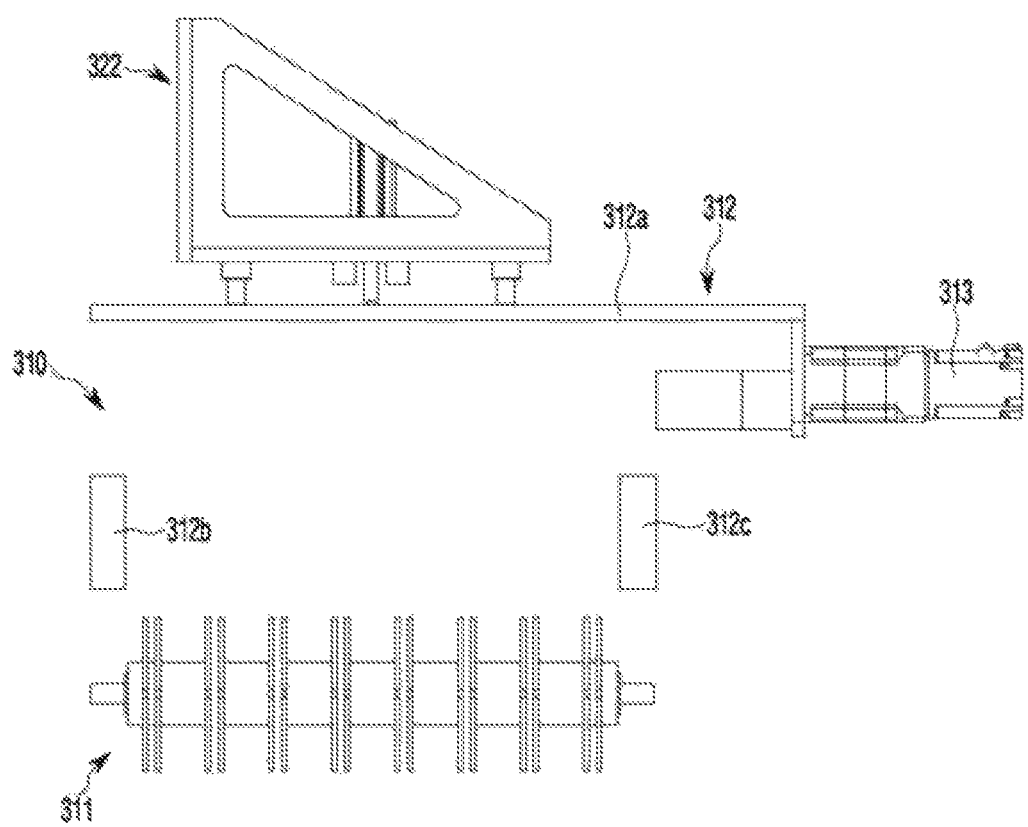
FIG. 16 is a diagram illustrating a method of removing the slag removing unit illustrated in FIG. 10.
Figure 17:
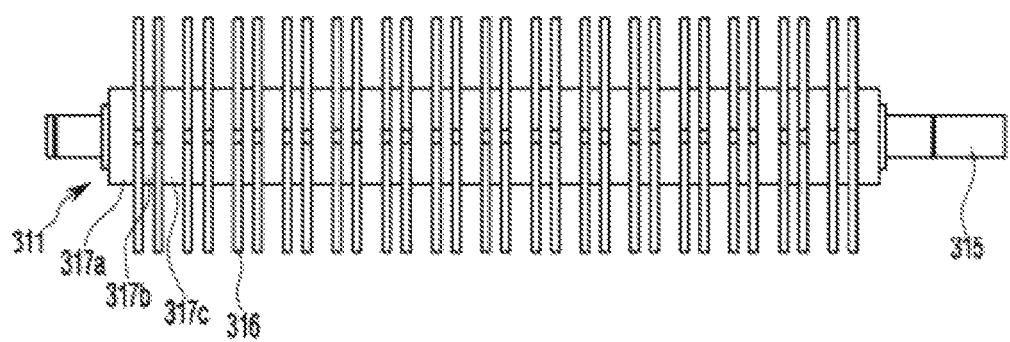
FIGS. 17 and 18 are diagrams illustrating a method of controlling an arrangement interval between blades.
Figure 18:
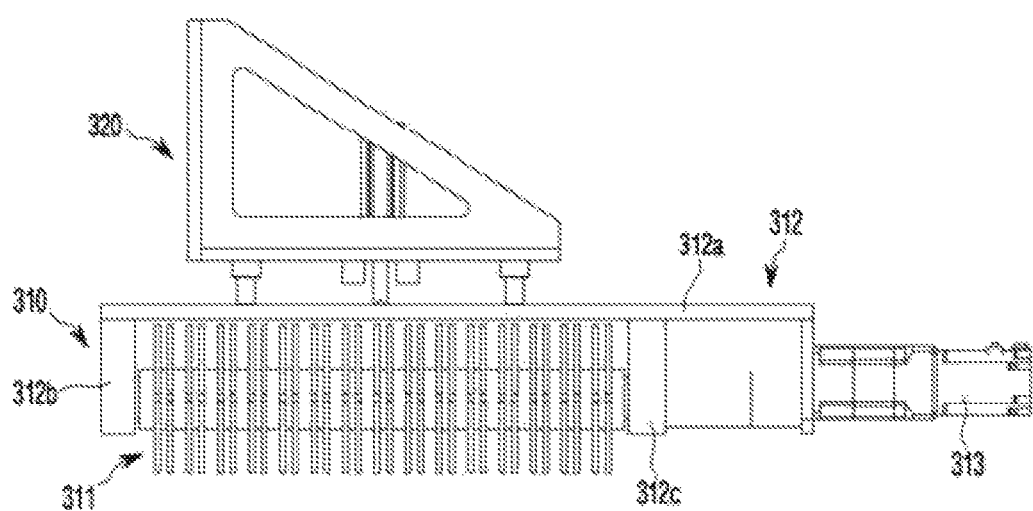

FIG. 16 is a diagram illustrating a method of removing the slag removing unit illustrated in FIG. 10, and FIGS. 17 and 18 are diagrams illustrating a method of controlling the arrangement gap between blades.

The width and arrangement gap of the plurality of support plates 410 may vary depending on the type and process condition of a laser processing machine or any other cutting machine. In this case, after the scraper 311 is removed from the support frame 312, the spacers 317 may be exchanged according to the width and arrangement gap of the plurality of support plates 410 in the cutting machine which is to perform a slag removal operation.

As illustrated in FIG. 16, the scraper 311 is removed from the support frame 312 by separating the rotation support plates 312b and 312c from a body 312a of the support frame 312. For this purpose, each of the rotation support plates 312b and 312c may be detachably engaged with the body 312a of the support frame 312 by means of a bolt or any other fastening member.

Subsequently, the plurality of blades 316 and the spacers 317 are removed sequentially from the shaft 315, as illustrated in FIG. 12.

As illustrated in FIG. 17, the plurality of blades 316 and the spacers 317 are then re-engaged sequentially with the shaft 315 in a predetermined order by means of the second spacers 317b and the third spacers 317c having the widths corresponding to the width and arrangement gap of the plurality of support plates 410 in the cutting machine which is to perform the slag removal operation.

As illustrated in FIG. 18, the scraper 311 with the exchanged second spacers 317b and third spacers 317c is then re-engaged with the support frame 312.

As described above, the arrangement gap of the plurality of blades 316 is controllable by exchanging the spacers 317 in the slag removal apparatus 300, thereby making it possible to apply the slag removal apparatus 300 to the plurality of support plates 410 conforming to various standards, with compatibility.

The driving member 313 provides driving force to rotate the scraper 311. This driving member 313 is preferably, but not limited to, a motor. The driving member 313 is fixed to a motor support plate 312d provided on one side of the support frame 312. Thus, the driving member 313 may rotate the shaft 315 and the plurality of blades 316 engaged with the shaft 315.

The torque sensor 314 is axially engaged with a rotation shaft of the driving member 313. Therefore, the torque sensor 314 may measure rotation load applied to the rotation shaft of the scraper 311 and/or the driving member 313. The measured rotation load may be input to the controller 360.

However, the rotation load measured by the torque sensor 314 may vary according to the amount and bonding force of slag attached to the plurality of support plates 410. That is, as the amount of the slag attached to the plurality of support plates 410 or the bonding force of the slag increases, the rotation load increases proportionally. Accordingly, when the slag removal operation is performed with a high rotation load measurement, slag attached to a specific part of the plurality of support plates 410, in which the high rotation load is measured may partially remain or the plurality of blades 316 or other components of the slag removing unit 310 may be damaged.

To overcome the problem, when the rotation load measurement is higher than a predetermined threshold, the controller 360 may transfer the slag removing unit 310 by the transfer unit 320 to repeat the slag removal operation two or more times on the specific part of the plurality of support plates 410, in which the high rotation load is measured, or may stop the driving member 313 of the slag removing unit 310 to discontinue the slag removal operation.

For example, when the rotation load measurement is higher than a predetermined first threshold, the controller 360 may retreat the slag removing unit 310 by a second transferrer 324 of the transfer unit 320 and repeat the slag removal operation two or more times on the specific part of the plurality of support plates 410, in which the high rotation load is measured.

For example, when the rotation load measurement is higher than a predetermined second threshold, the controller 360 may stop the driving member 313 of the slag removing unit 310 to discontinue the slag removal operation. The second threshold is preferably higher than the first threshold, which should not be construed as limiting.

The torque sensor 314 has been described as axially engaged with the rotation shaft of the driving member 313, which should not be construed as limiting. That is, the torque sensor 314 may be axially engaged with the shaft 315.

Figure 19:
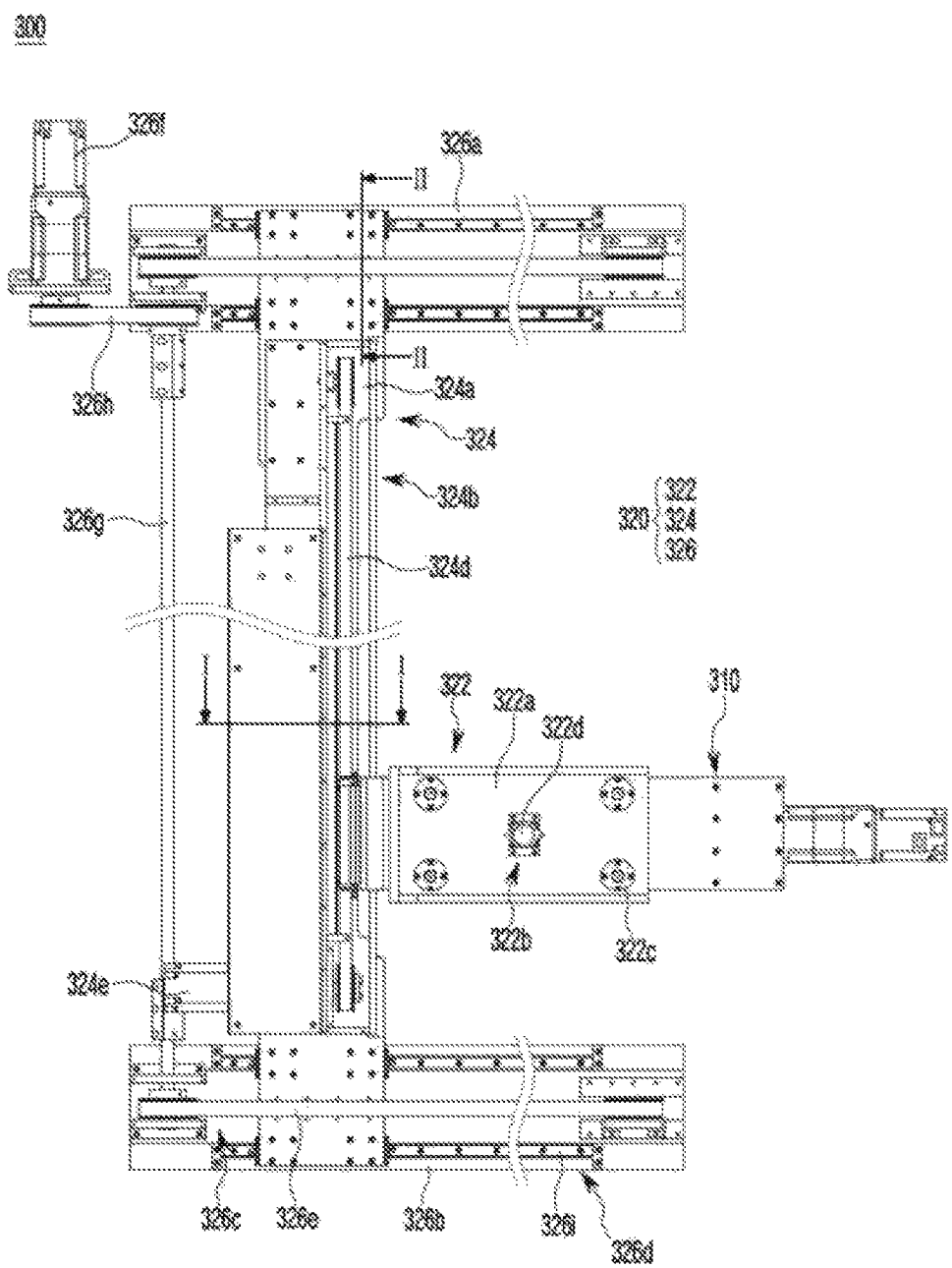
FIG. 19 is a plan view illustrating the slag removal apparatus illustrated in FIG. 8.

FIG. 19 is a plan view illustrating the slag removal apparatus illustrated in FIG. 8.

The transfer unit 320 is provided to transfer the slag removing unit 310 along three-axis directions. For this purpose, the transfer unit 320 may include a first transferrer 322 transferring the slag removing unit 310 in the height direction of the plurality of support plates 410, a second transferrer 324 transferring the slag removing unit 310 in the length direction of the plurality of support plates 410, and a third transferrer 326 transferring the slag removing unit 310 in the width direction of the plurality of support plates 410.

As illustrated in FIG. 15, the first transferrer 322 may include a first housing 322a, a first transfer member 322b, and first guide members 322c.

A transfer member available as the first transfer member 322b is not limited to any specific type. For example, the first transfer member 322b may include an air cylinder 322d in which a cylinder rod 322e is installed to make a translational motion in the height direction of the plurality of support plates 410. In this case, the first transfer member 322b may be fixed to the first housing 322a, and the cylinder rod 322e may penetrate through the first housing 322a and be engaged with the body 312a of the support frame 312. This first transfer member 322b may reciprocally transfer the slag removing unit 310 in the height direction of the plurality of support plates 410.

Each of the first guide members 322c may have one end fixed to the body 312a of the support frame 312 and the other end mounted in the first housing 322a, to move in the height direction of the plurality of support plates 410. Therefore, the first guide members 322c may guide transfer of the slag removing unit 310 in the height direction of the plurality of support plates 410, when the first transfer member 322b is driven.

Figure 20:
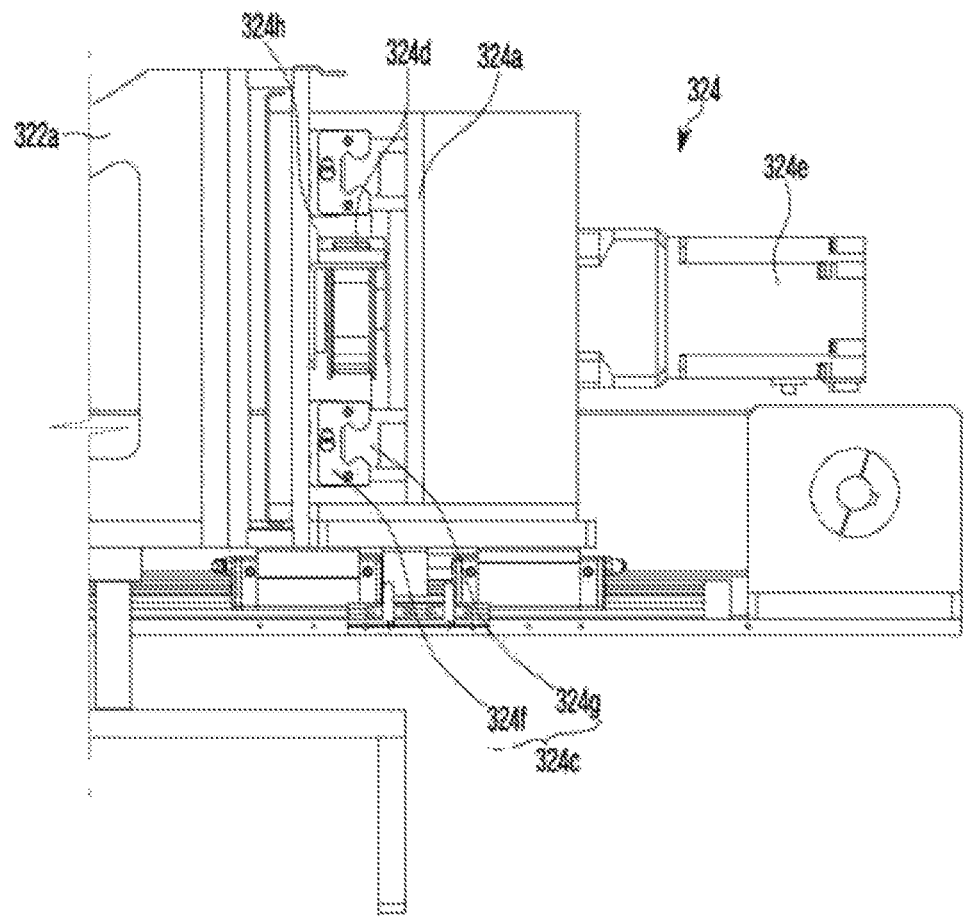
FIG. 20 is a sectional view illustrating the slag removal apparatus illustrated in FIG. 9, taken along line I-I.

FIG. 20 is a sectional view illustrating the slag removal apparatus illustrated in FIG. 19, taken along line I-I.

As illustrated in FIGS. 19 and 20, the second transferrer 324 may include a second housing 324a, a second transfer member 324b, and second guide members 324c.

The second housing 324a is disposed to extend along the length direction of the plurality of support plates 410 and provide a space in which the components of the second transferrer 324 are accommodated.

A transfer member available as the second transfer member 324b is not limited to any specific type. For example, the second transfer member 324b may include a second transfer belt 324d and a second driving motor 324e.

The second transfer belt 324d is installed in the second housing 324a, to extend in the length direction of the plurality of support plates 410. The second driving motor 324e may be axially engaged with a pulley at one side of the second transfer belt 324d. Further, the second transfer belt 324d is engaged with the first housing 322a of the first transferrer 322 by a fixing tip 324h. Thus, the second transfer belt 324d may reciprocally transfer the first transferrer 322 and the slag removing unit 310 engaged with the first transferrer 322 along the length direction of the plurality of support plates 410 according to a rotational direction of the second driving motor 324e.

Each of second guide members 324c may include a second linear rail 324f extending along the length direction of the plurality of support plates 410 in the second housing 324a, and a second guide block 324g engaged with the second linear rail 324f, movably along the length direction of the plurality of support plates 410. The second guide members 324c may guide transfer of the first transferrer 322 and the slag removing unit 310 engaged with the first transferrer 322 along the length direction of the plurality of support plates 410, when the second transfer members 324b are driven.

Figure 21:
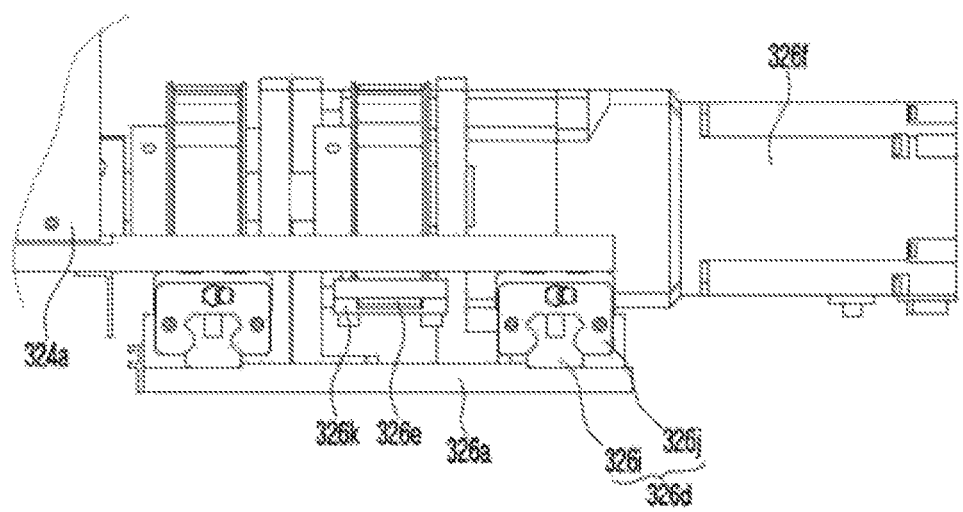
FIG. 21 is a sectional view illustrating the slag removal apparatus illustrated in FIG. 9, taken along line II-II.

FIG. 21 is a sectional view illustrating the slag removal apparatus illustrated in FIG. 19, taken along line II-II.

The third transferrer 326 may include third housings 326a and 326b, third transfer members 326c, and third guide members 326d.

There are preferably a pair of third housings 326a and 326b. The pair of third housings 326a and 326b are disposed to extend along the width direction of the plurality of support plates 410, with the second transferrer 324 interposed between the pair of third housings 326a and 326b. Each of the third housings 326a and 326b provides a space in which components of the third transferrer 326 are installed.

One of the third transfer members 326c is installed in each of the third housings 326a and 326b. A transfer member available as one of the third transfer members 326c is not limited to any specific type. For example, one of the third transfer members 326c may include a third transfer belt 326e and a third driving motor 326f.

The third transfer belts 326e are installed in the third housings 326a and 326b, to extend in the width direction of the plurality of support plates 410. A pulley on one side of the third transfer belt 326e installed in the third housing 326a is coupled to a pulley on one side of the third transfer belt 326e installed in the third housing 326b by means of a connection shaft 326g, for interworking. Further, the connection shaft 326g is coupled to the third driving motor 326f by a connection belt 326h. For this purpose, the third driving motor 326f is axially coupled to a pulley on one side of the connection belt 326h, and the connection shaft 326g is axially coupled to a pulley on the other side of the connection belt 326h. Therefore, when the third driving motor 326f rotates, the third transfer belts 326e may rotate simultaneously.

Further, each of the third transfer belts 326e is coupled to one of both ends of the second housing 324a by a fixing tip 326k. Hence, each third transfer belt 326e may reciprocally transfer the second transferrer 324, and the first transferrer 322 and the slag removing unit 310 which are coupled to the second transferrer 324 in the width direction of the plurality of support plates 410 according to a rotational direction of the third driving motor 326f.

Each of the third guide members 326d may include a third linear rail 326i extending in the width direction of the plurality of support plates 410, and a third guide block 326j coupled to the third linear rail 326i, movably in the width direction of the plurality of support plates 410, in the third housing 326a or 326b. The third guide members 326d may guide transfer of the second transferrer 324, and the first transferrer 322 and the slag removing unit 310 which are coupled to the second transferrer 324 along the width direction of the plurality of support plates 410.

Figure 22:
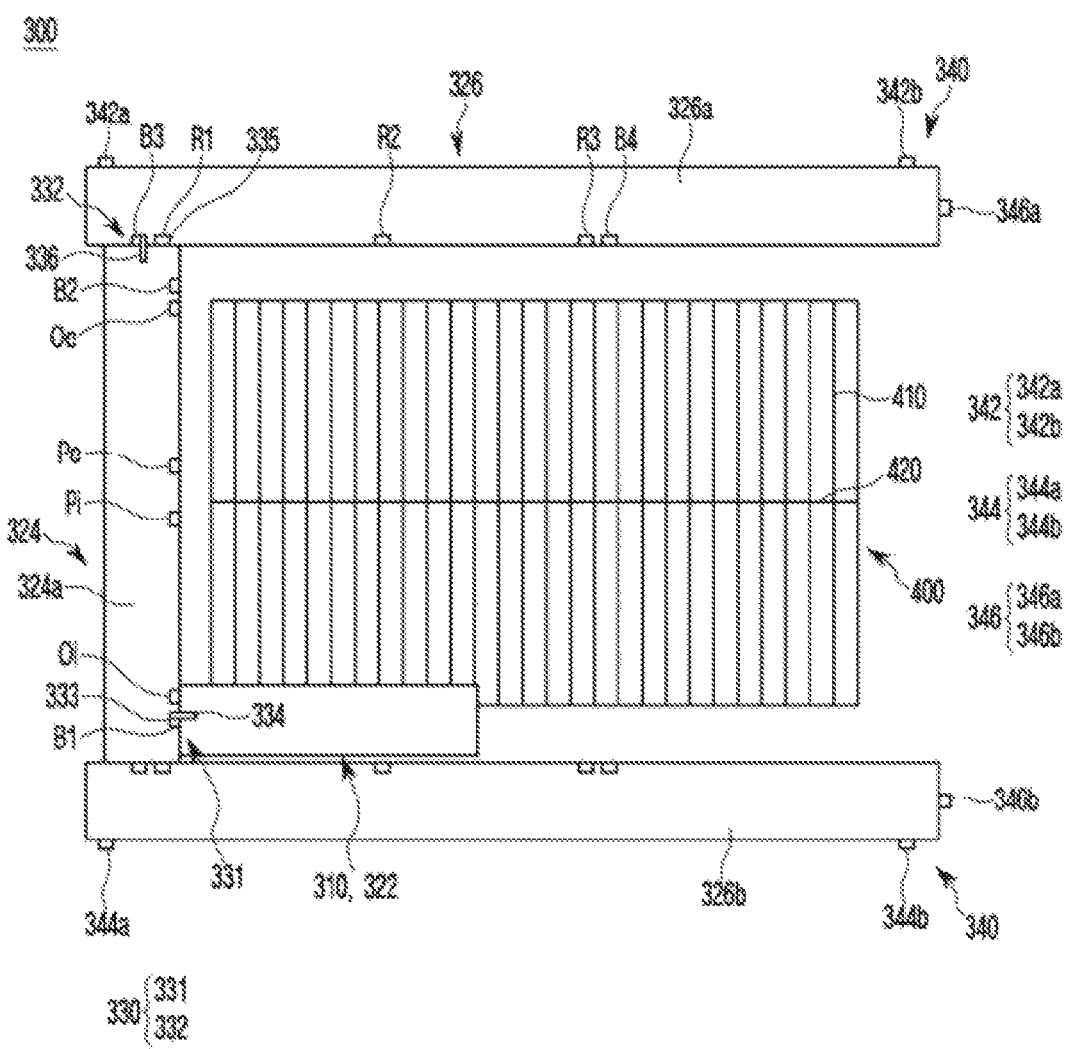
FIG. 22 is a diagram illustrating installation of a position sensing unit and an obstacle sensing unit illustrated in FIG. 9.

FIG. 22 is a diagram illustrating installation of a position sensing unit and an obstacle sensing unit illustrated in FIG. 9.

The position sensing unit 330 may include a first sensor 331 and a second sensor 332.

The first sensor 331 is provided to sense the position of the slag removing unit 310 in the length direction of the plurality of support plates 410. For this purpose, the first sensor 331 may include a plurality of first position sensors 333 and a first position sensing bar 334.

Each of the plurality of first position sensors 333 may be installed at a predetermined position in the second housing 324a of the second transferrer 324. For example, the one of the plurality of first position sensors 333 may be installed at a transfer bound point B1, an operation starting point Oi, a pass starting point Pi, a pass ending point Pe, an operation ending point Oe, and a second transfer bound point B2.

The first transfer bound point B1 is a transfer limit point of the second transferrer 324 in the length direction of the plurality of support plates 410, corresponding to an initial position of the first transferrer 322. The first transfer boundary point B1 is preferably set such that the first transferrer 322 and the slag removing unit 310 are spaced from the third housing 326b by a predetermined distance. Therefore, collision of the first transferrer 322 and the slag removing unit 310 against the third transferrer 326 may be prevented.

The operation starting point Oi corresponds to a point at which the slag removal operation for the plurality of support plates 410 starts. The operation starting point Oi is set to, preferably, but not limited to, a position corresponding to one end of each support plate of the plurality of support plates 410 close to the first transfer boundary point B1.

The pass starting point Pi corresponds to a point at which the plurality of blades 316 start to skip the gap maintaining plates 420 of the support plate assembly 400. The pass starting point Pi is set to, preferably, but not limited to, a position spaced from the installation position of the gap maintaining plates 420 toward the operation starting point Oi by a predetermined distance.

The pass ending point Pe corresponds to a point at which the plurality of blades 316 end the operation of skipping the gap maintaining plates 420 of the support plate assembly 400. The pass ending point Pe is set to, preferably, but not limited to, a position opposite to the operation starting point Oi, that is, a position spaced from the installation position of the gap maintaining plates 420 toward the operation ending point Oe by a predetermined distance.

As many pass starting points Pi as the number of gap maintaining plates 420 and as many pass ending points Pe as the number of gap maintaining plates 420 may be set at an interval identical to the arrangement gap of the gap maintaining plates 420.

The operation ending point Oe corresponds to a point at which the slag removal operation for the plurality of support plates 410 ends. The operation ending point Oe is set to, preferably but not limited to, a position corresponding to the other end of each support plate of the plurality of support plates 410 opposite to the first transfer boundary point B1, that is, close to the second transfer boundary point B2 by a predetermined distance.

The second transfer boundary point B2 is a transfer limit point of the first transferrer 322 in the length direction of the plurality of support plates 410. The second transfer boundary point B2 corresponds to a switching reference point at which the transfer direction of the first transferrer 322 switches to a direction to the first transfer boundary point B1. The second transfer boundary point B2 is set to, preferably, but not limited to, a position at which the first transferrer 322 and the slag removing unit 310 are spaced from the other third housing 326a by a predetermined distance or more. Therefore, collision of the first transferrer 322 and the slag removing unit 310 against the third transferrer 326 may be prevented.

Sensors available as the plurality of first position sensors 333 are not limited to any specific type. Each of the plurality of first position sensors 333 may be any of various sensors capable of detecting entry of the first position sensing bar 324 into a predetermined sensing range.

The first position sensing bar 334 may be installed at a predetermined position in the first housing 322a, so that the first transferrer 322 and the slag removing unit 310 engaged with the first transferrer 322 may sequentially pass through one of the plurality of first position sensors 333 during movement in the length direction of the plurality of support plates 410 by the second transferrer 324. Hence, each of the plurality of first position sensors 333 may sense the position of the first transferrer 322 and the slag removing unit 310 engaged with the first transferrer 322 in the length direction of the plurality of support plates 410 through the first position sensing bar 334 and then input the sensed position to the controller 360.

The second sensor 332 is provided to sense the position of the slag removing unit 310 in the width direction of the plurality of support plates 410. For this purpose, the second sensor 332 may include a plurality of second position sensors 335 and a second position sensing bar 336.

The second position sensors 335 may be installed at predetermined positions in the third housings 326a and 326b of the third transferrer 326. For example, the second position sensors 335 may be installed at a third transfer boundary point B3, operation reference points R1, R2 and R3, and a fourth transfer boundary point B4.

The third transfer boundary point B3 is a transfer limit point for the third transferrer 326 in the width direction of the plurality of support plates 410, corresponding to an initial position of the second transferrer 324. The third transfer boundary point B3 is preferably set such that the second transferrer 324, and the first transferrer 322 and the slag removing unit 310 which are engaged with the second transferrer 324 are spaced from one end of each of the third housings 326a and 326b by a predetermined distance, which should not be construed as limiting. Therefore, collision of the second transferrer 324, and the first transferrer 322 and the slag removing unit 310 which are engaged with the second transferrer 324 against an obstacle near to the slag removal apparatus 300 may be prevented.

The operation reference points R1, R2 and R3 correspond to reference points at which the plurality of support plates 410 are designated for simultaneous slag removal through the scraper 311 from among the total of the plurality of support plates 410. The scraper 311 is provided with a plurality of blades 316 to remove slag from a plurality of support plates 410. Therefore, the operation reference points R1, R2 and R3 are set at, preferably but not limited to, an interval equal to the sum of the arrangement gaps of all of the plurality of support plates 410 from which slag may be removed at the same time by means of the scraper 311. For example, when the scraper 311 is configured to simultaneously remove slag from eight of the plurality of support plates 410, the operation reference points R1, R2 and R3 may be set at the same interval as the sum of the arrangement gaps of eight of the plurality of support plates 410.

The fourth transfer boundary point B4 is a transfer limit for the third transferrer 326 in the width direction of the plurality of support plates 410, corresponding to a switching reference point at which the transfer direction of the second transferrer 324 switches to the direction to the third transfer boundary point B3. The fourth transfer boundary point B4 is preferably set such that the second transferrer 324, and the first transferrer 322 and the slag removing unit 310 which are engaged with the second transferrer 324 are spaced from the other end of each of the third housings 326a and 326b by a predetermined distance, which should not be construed as limiting. Therefore, collision of the second transferrer 324, and the first transferrer 322 and the slag removing unit 310 which are engaged with the second transferrer 324 against an obstacle near to the slag removal apparatus 300 may be prevented.

The second position sensing bar 336 may be installed at a predetermined position in the second housing 324a of the second transferrer 324, such that the second transferrer 324, and the first transferrer 322 and the slag removing unit 310 which are engaged with the second transferrer 324 may sequentially pass through the second position sensors 335 during movement in the width direction of the plurality of support plates 410 by the third transferrer 326. For example, when the second position sensors 335 are installed in each of the third housings 326a and 326b as illustrated in FIG. 22, a second position sensing bar 336 may be installed at each of both ends of the second housing 324a. Hence, the second position sensors 335 may sense the positions of the second transferrer 324, and the first transferrer 322 and the slag removing unit 310 which are engaged with the second transferrer 324 in the width direction of the support plates 410 through the second position sensing bars 336 and input the sensed positions to the controller 360.

The obstacle sensing unit 340 is a device that senses approach of an operator or any other obstacle to the slag removal apparatus 300. For this purpose, the obstacle sensing unit 340 may include a plurality of obstacle sensors 342, 344, and 346.

Each of the plurality of obstacle sensors 342, 344, and 346 may be installed at a predetermined position to sense entry of an operator or any other obstacle in paths running to the slag removing unit 310.

For example, at least a part of the obstacle sensors 342 and 344 of the plurality of obstacle sensors 342, 344, and 346 may be installed on surfaces of the third housings 326a and 326b, which face in the side directions of the slag removal apparatus. Therefore, the obstacle sensors 342 and 344 may sense approach of an obstacle from the side directions of the slag removal apparatus 300.

For example, at least a part of the obstacle sensor 346 of the plurality of obstacle sensors 342, 344 and 346 may be installed on another surface of each of the third housings 326a and 326b facing in the front or rear direction of the slag removal apparatus 300. As illustrated in FIG. 22, when the slag removing unit 310 is installed in the second transferrer 324, facing in the rear direction of the slag removal apparatus 300, an obstacle may approach the slag removing unit 310 through the gap between the third housings 326a and 326b from the rear direction of the slag removal apparatus 300. In this case, the obstacle sensor 346 is installed on, preferably but not limited to, the surface of each of the third housings 326a and 326b, facing in the rear direction of the slag removal apparatus 300.

Sensors available as the plurality of obstacle sensors 342, 344 and 346 are not limited to any specific type. For example, each of the plurality of obstacle sensors 342, 344 and 346 may be configured as a photosensor including a light emitting element 342a, 344a, or 346a outputting an optical signal, and a light receiving element 342b, 344b or 346b. In this case, the waveforms of optical signals received at the light receiving elements 342b, 344b and 346b vary depending on how an obstacle approaches, and the light receiving elements 342b, 344b and 346b convert the optical signals received from the light emitting elements 342a, 344a and 346a to electrical signals, that is, obstacle sensing signals and input the obstacle sensing signals to the controller 360. Therefore, the controller 360 may determine whether an obstacle is approaching based on the obstacle sensing signals received from the light receiving elements 342b, 344b and 346b.

The communication module 350 is provided to implement Internet of things (IoT) enabling remote control of the slag removal apparatus 300 by using a Web site, an application, or the like dedicated to the slag removal apparatus 300. For this purpose, the communication module 350 may include a communication member for connecting the slag removal apparatus 300 to an external server or a terminal wiredly or wirelessly, for example, by wireless fidelity (WiFi) or Bluetooth. The communication module 350 may input a signal received from the external server or the terminal to the controller 360 or transmit a signal received from the controller 360 to the external server or the terminal, thereby remotely operating the slag removal apparatus 300. Hence, a plurality of the slag removal apparatus 300 may be managed by small personnel, thereby increasing productivity. Further, the operator may be protected against damage from the slag removal apparatus 300.

FIGS. 23 to 32 are diagrams illustrating a method of removing slag by the slag removing unit.

With reference to the related drawings, the method of removing slag by the slag removal apparatus 300 will be described below.

As illustrated in FIG. 22, with the slag removing unit 310 placed at the initial position (with the slag removing unit 310 placed at the first transfer boundary point B1 in the length direction of the plurality of support plates 410 and at the third transfer boundary point B3 in the width direction of the plurality of support plates 410), the controller 360 may prepare to operate the slag removal apparatus 300.

Figure 23:
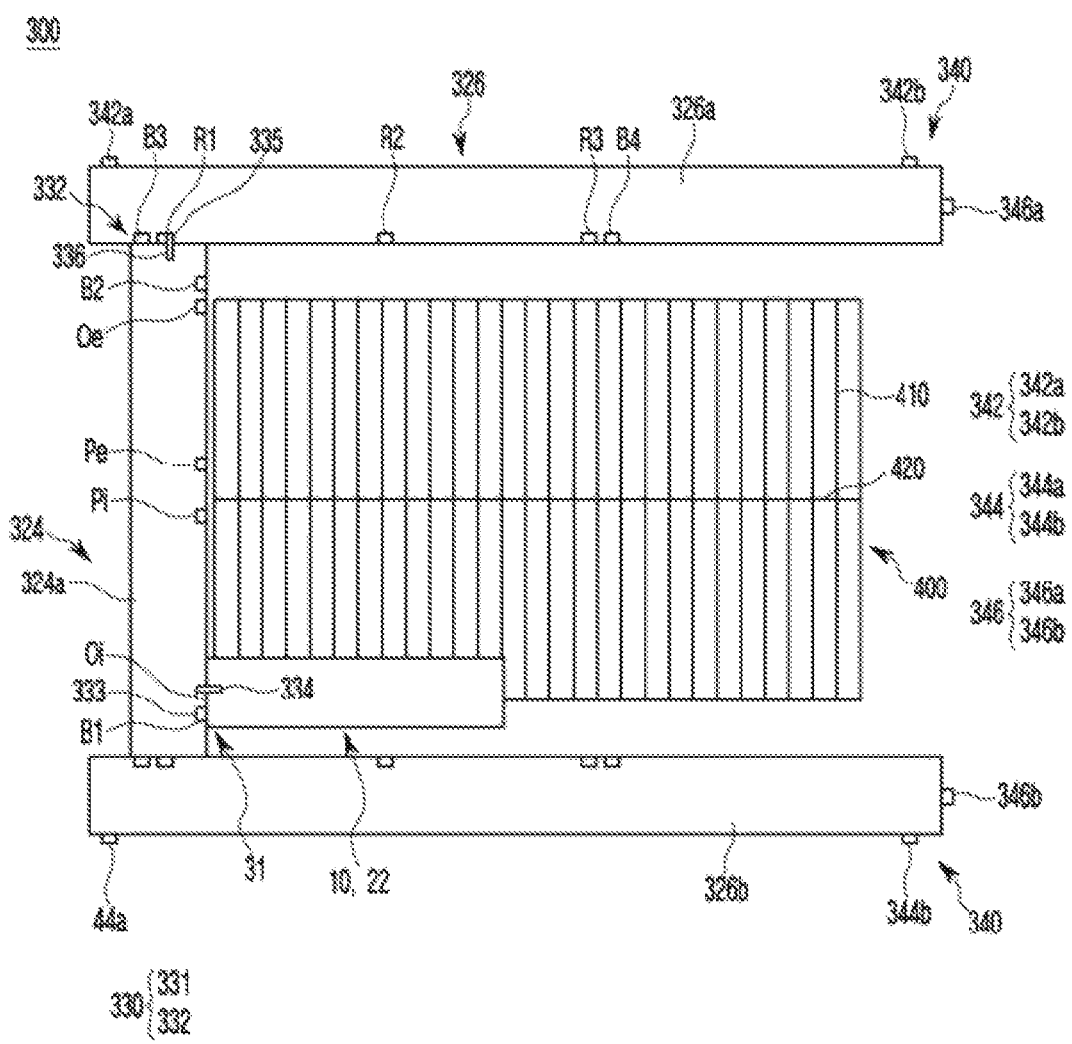
FIGS. 23 to 32 are diagrams referred to for describing a method of removing slag by the slag removing unit.

As illustrated in FIG. 23, the controller 360 may then operate the second transferrer 324 and the third transferrer 326 to transfer the slag removing unit 310 in the length and width directions of the plurality of support plates 410, so that the slag removing unit 310 may be placed at the operation starting point Oi in the length direction of the plurality of support plates 410 and at the first operation reference point R1 among the operation reference points R1, R2 and R3 in the width direction of the plurality of support plates 410.

Figure 24:
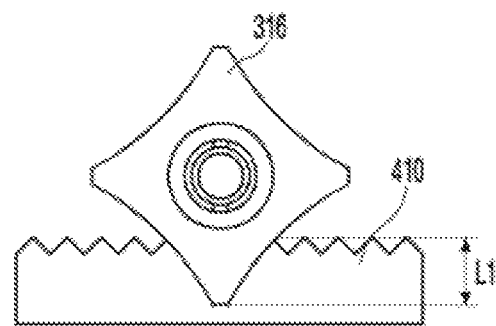

Subsequently, as illustrated in FIGS. 15 and 24, the controller 360 may lower the slag removing unit 310 in the height direction of the plurality of support plates 410 by operating the first transferrer 322, so that each of the plurality of support plates 410 may be inserted to a first depth L1 between the plurality of blades 316.

The controller 360 may then transfer the slag removing unit 310 toward the operation ending point Oe by driving the second transferrer 324, together with rotation of the plurality of blades 316 by operating the driving member 313 of the slag removing unit 310. Then, the plurality of blades 316 may remove slag attached to both side surfaces of the plurality of support plates 410 by scraping out the slag.

Figure 25:
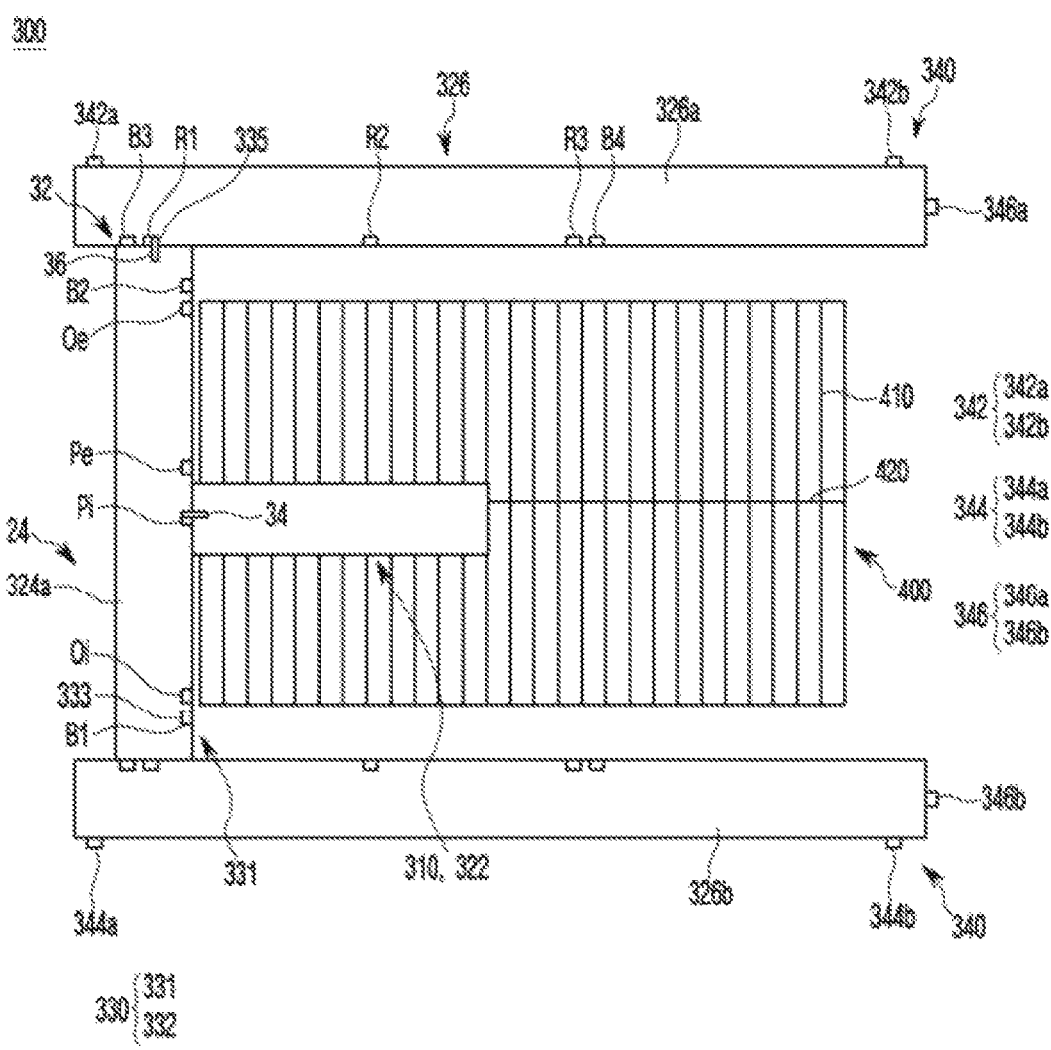
Figure 26:
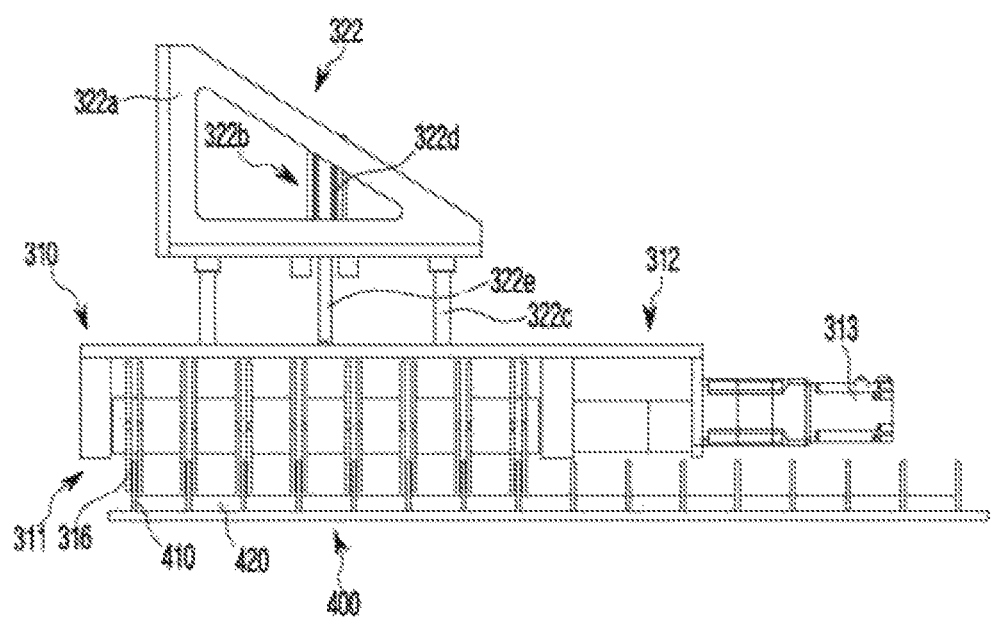
Figure 27:
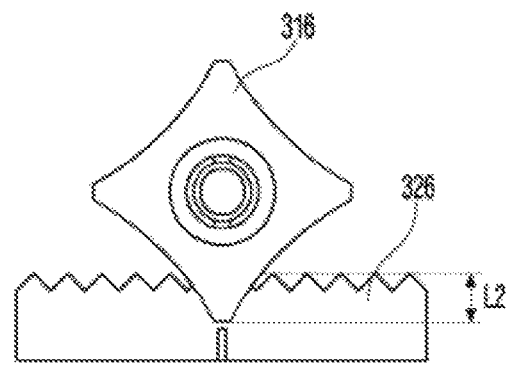

Subsequently, as illustrated in FIGS. 25, 26 and 27, when the slag removing unit 310 reaches the pass starting point Pi, the controller 360 may raise the slag removing unit 310 in the height direction of the plurality of support plates 410 by operating the first transferrer 322, so that each of the plurality of support plates 410 may be inserted to a second depth L2 smaller than the first depth L1 between the plurality of blades 316. The second depth L2 is not limited to any specific value. The second depth L2 is set to a value that enables slag removal by allowing the plurality of blades 316 to proceed at a position higher than the gap maintaining plate 420 by a predetermined height, when the plurality of blades 316 pass the installation position of the gap maintaining plate 420. That is, the second depth L2 is determined such that when the plurality of blades 316 pass the installation position of the gap maintaining plate 420, the plurality of blades 316 are spaced from the gap maintaining plate 420 by a predetermined gap. Therefore, the controller 360 may prevent the plurality of blades 316 and the gap maintaining plate 420 from colliding each other and thus damaging the slag removal apparatus 300 and the plurality of support plates 410.

Subsequently, as illustrated in FIGS. 15 and 24, when the slag removing unit 310 reaches the pass ending point Pe, the controller 360 may lower the slag removing unit 310 in the height direction of the plurality of support plates 410 by operating the first transferrer 322 so that each of the plurality of support plates 410 may be inserted again to the first depth L1 between the plurality of blades 316.

Figure 28:
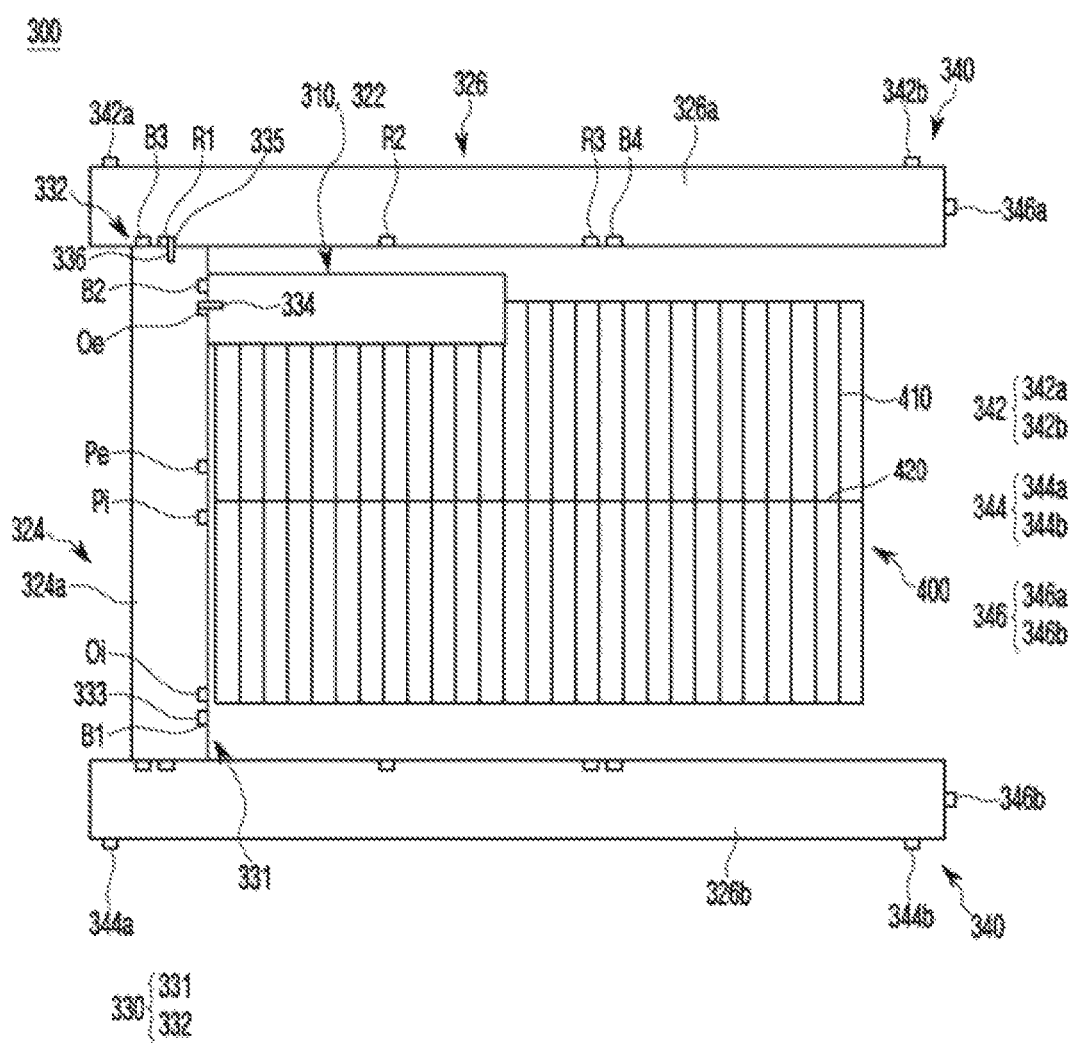

Subsequently, as illustrated in FIG. 28, when the slag removing unit 310 reaches the operating ending point Oe, the controller 360 may stop the driving member 313 of the slag removing unit 310. Therefore, the slag removal operation for the plurality of support plates 410 corresponding to the first operation reference point R1 among the operation reference points R1, R2 and R3 may end. The controller 360 may raise the slag removing unit 310 by operating the first transferrer 322 to withdraw each of the plurality of support plates 410 from between the plurality of blades 316.

Figure 29:
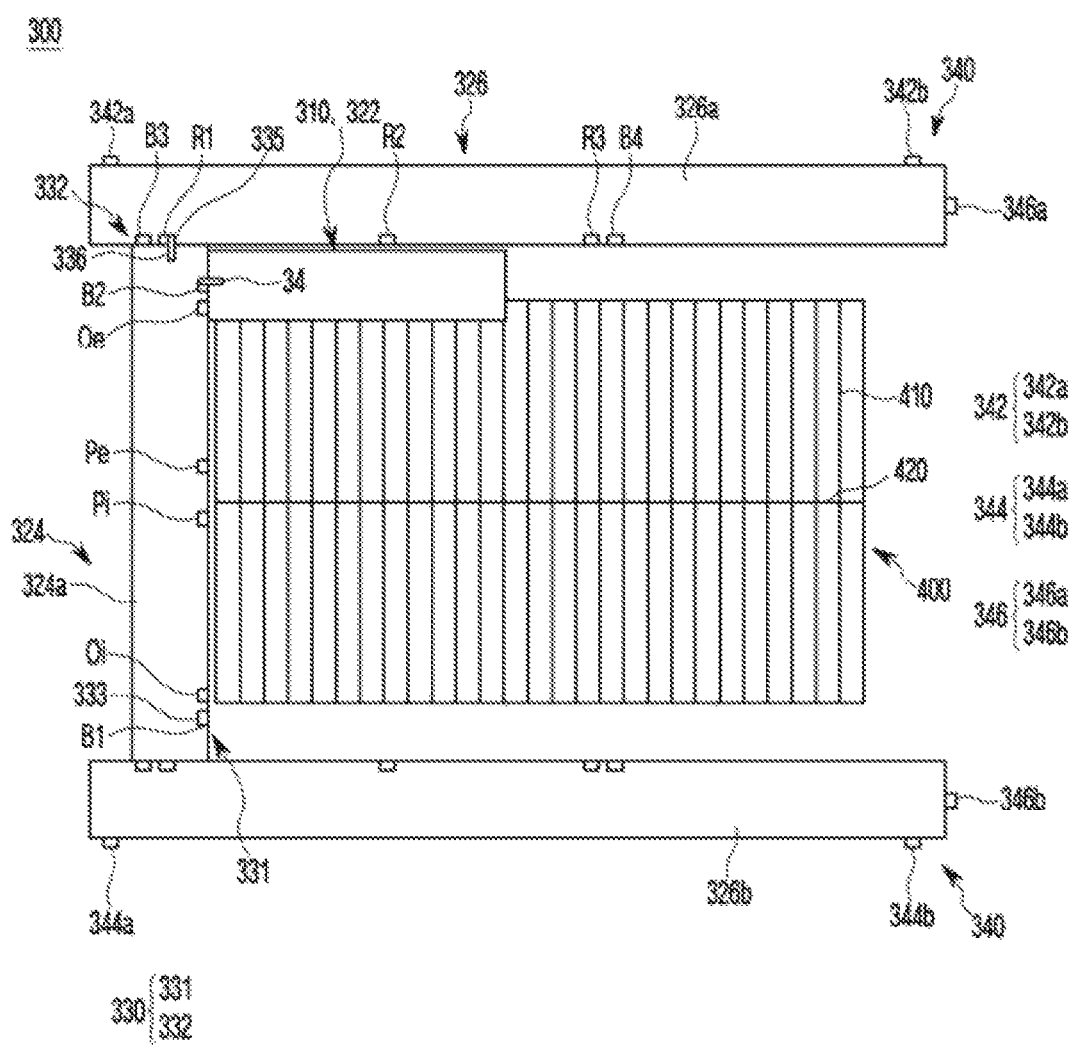

Subsequently, as illustrated in FIG. 29, when the slag removing unit 310 reaches the second transfer boundary point B2, the controller 360 may return the slag removing unit 310 to the operation starting point Oi or the first transfer boundary point B1 by operating the second transferrer 324 in a reverse direction.

Figure 30:
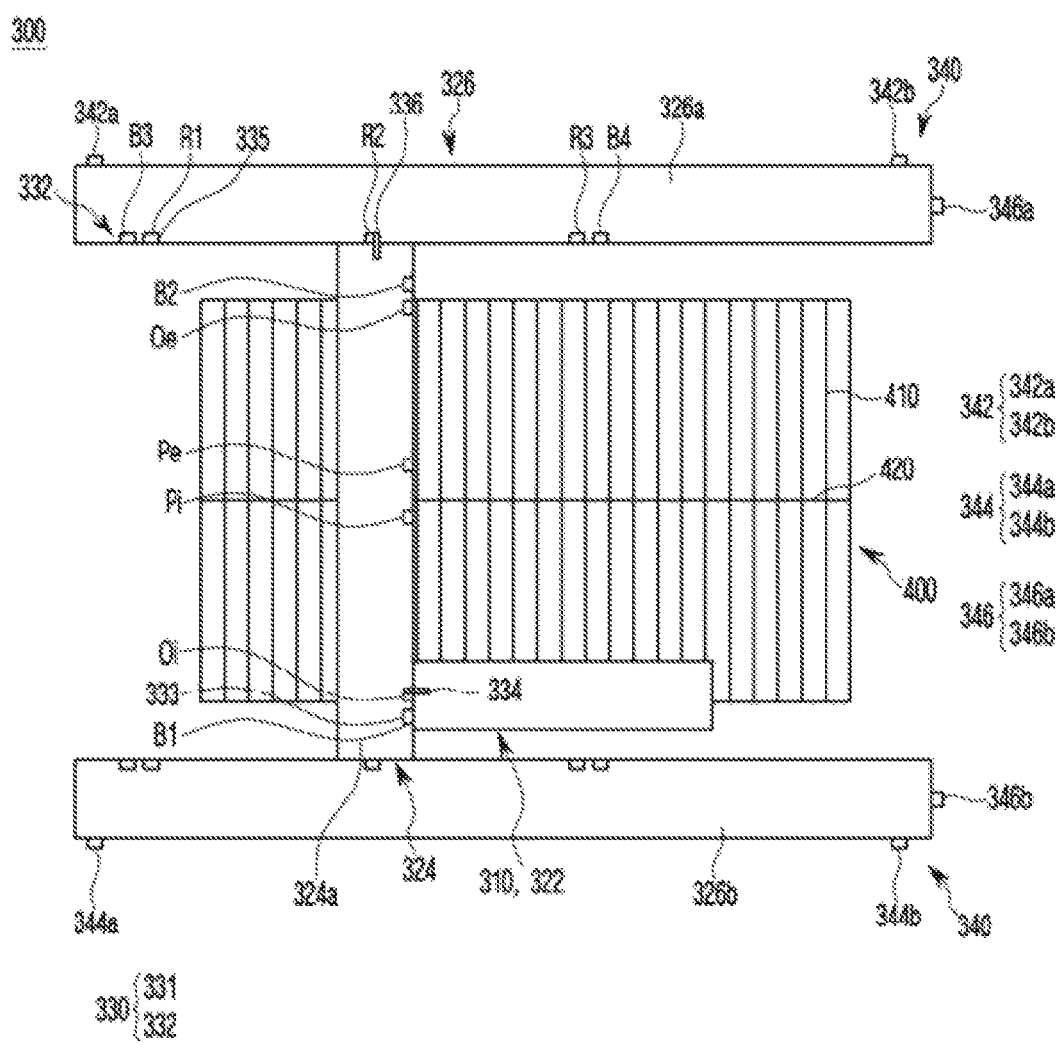
Figure 31:
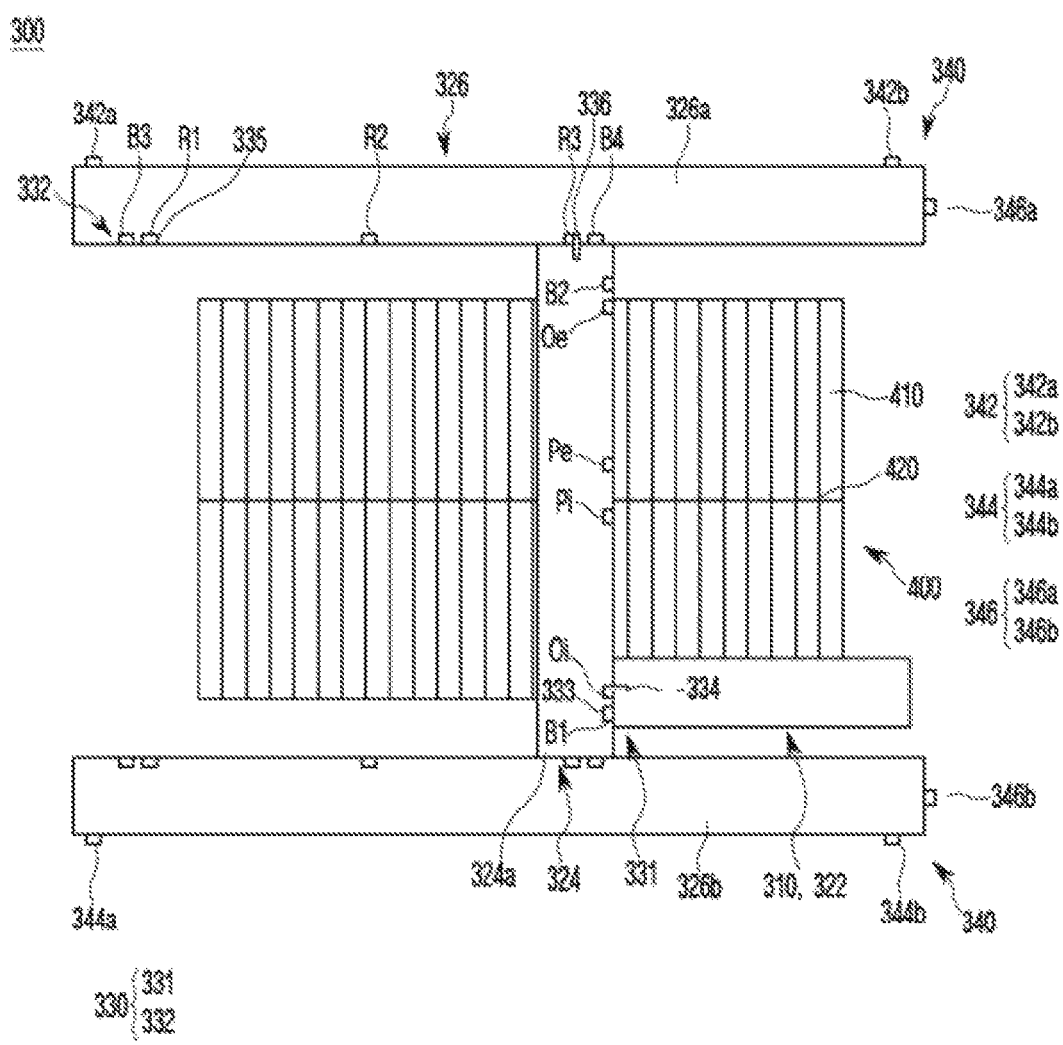

Subsequently, as illustrated in FIGS. 30 and 31, the controller 360 may operate the slag removing unit 310 and the transferrer unit 320 to sequentially perform the slag removal operation for each support plate of the plurality of support plates 410 corresponding to each of the remaining operation reference points R2 and R3 among the operation reference points R1, R2 and R3.

Figure 32:
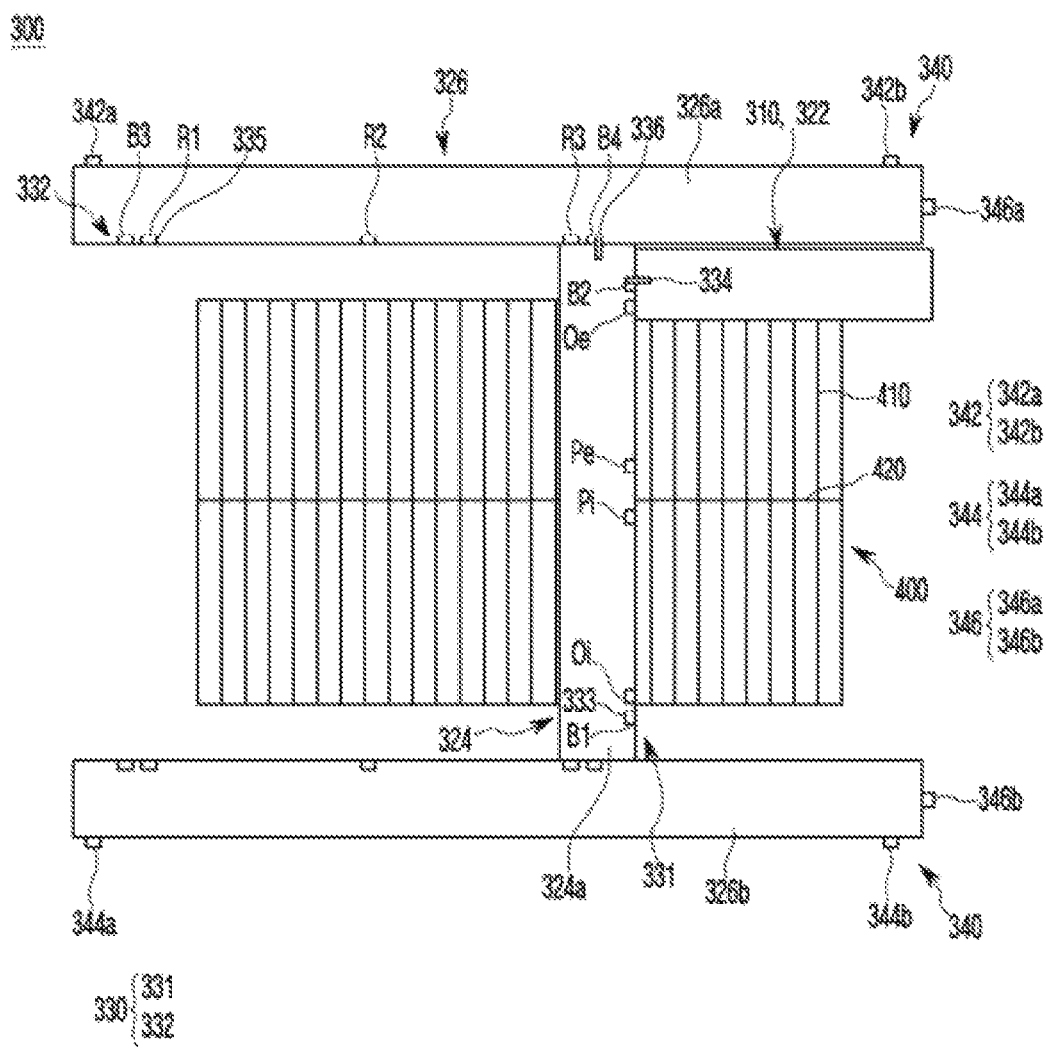

Subsequently, as illustrated in FIG. 32, when the slag removing unit 310 reaches a return position (i.e., when the slag removing unit 310 reaches the second transfer boundary point B2 in the length direction of the plurality of support plates 410 and the fourth transfer boundary point B4 in the width direction of the plurality of support plates 410), the controller 360 may return the slag removing unit 310 to its initial position by operating the second transferrer 324 and the third transferrer 326.

Therefore, the embodiments of the present disclosure are intended to describe the technical idea of the present disclosure, not limiting the present disclosure. The scope of the disclosure should be determined by the appended claims and their legal equivalents, not by the above description, and all changes coming within the meaning and equivalency range of the appended claims are intended to be embraced therein.

The invention claimed is:

1. A slag removal apparatus for removing slag from support plates provided to support an object to be processed in a cutting machine, the slag removal apparatus comprising:
   a scraper including a plurality of blades around an outer surface of a bar crossing the support plates, and a plurality of slots formed in the respective blades along a length direction and thus formed around the bar and in a length direction of the bar;

a rotation support unit to which the scraper is rotatably installed;

a rotation driving unit rotating the scraper from the rotation support unit to remove slag attached to the support plates by the blades, when the support plates are inserted into the slots;

a lifting unit lowering the scraper, for insertion of the support plates into the slots and raising the scraper to an original position by raising and lowering the rotation support unit; and a first transfer unit moving the rotation support unit along a length direction of the support plates to allow the scraper to remove the slag along the length direction of the support plates.

2. The slag removal apparatus according to claim 1, wherein the blades are formed to be straight in a radius direction from the bar in the scraper.

3. The slag removal apparatus according to claim 1, wherein the blades are formed to be curved in a radius direction from the bar in the scraper.

4. The slag removal apparatus according to claim 1, wherein a plurality of scrapers are arranged in parallel and installed to be rotated by the rotation driving unit, in the rotation support unit.

5. The slag removal apparatus according to claim 4, wherein the blades of one of the plurality of scrapers are formed to be straight in a radius direction from the bar, and the blades of another of the plurality of scrapers are formed to be curved in the radius direction from the bar.

6. The slag removal apparatus according to claim 1, wherein the lifting unit comprises:
a transfer member installed to move in the length direction by the first transfer unit;
a lifting guide guiding upward and downward movement of the rotation support unit to and from the transfer member; and
a lifting driver raising and lowering the rotation support unit to and from the transfer member.

7. The slag removal apparatus according to claim 1, wherein the first transfer unit comprises:
a first transfer frame supporting the lifting unit, for movement of the lifting unit in the length direction;
a first transfer guide guiding movement of the lifting unit along the length direction on the first transfer frame; and
a first transfer driver reciprocally moving the lifting unit in the length direction on the first transfer frame.

8. The slag removal apparatus according to claim 7, further comprising a second transfer unit moving the rotation support unit in a transverse direction of the support plates,
wherein the second transfer unit comprises:
a second transfer frame supporting the first transfer unit, for movement of the first transfer unit in the transverse direction;
a second transfer guide guiding movement of the first transfer unit along the transverse direction; and
a second transfer driver reciprocally moving the first transfer unit in the transverse direction on the second transfer frame.

9. The slag removal apparatus according to claim 1, further comprising a second transfer unit moving the rotation support unit in a transverse direction of the support plates,
wherein the first transfer unit comprises:

a first transfer frame supporting the second transfer unit, for movement of the second transfer unit in the length direction;
a first transfer guide guiding movement of the second transfer unit along the length direction on the first transfer frame; and
a first transfer driver reciprocally moving the second transfer unit in the length direction on the first transfer frame, and
wherein the second transfer unit comprises:
a second transfer frame supporting the lifting unit, for movement of the lifting unit in the transverse direction;
a second transfer guide guiding movement of the lifting unit along the transverse direction on the first transfer frame; and
a second transfer driver reciprocally moving the lifting unit in the transverse direction on the second transfer frame.

10. A slag removal apparatus for removing slag from support plates provided to support an object to be processed in a cutting machine, the slag removal apparatus comprising:
a slag removing unit including a plurality of blades disposed to allow each of the support plates to be inserted into a gap between blades belonging to the same pair, and a driving member rotating the blades to remove slag attached to the support plates by the blades;
a transfer unit including a first transferer transferring the slag removing unit in a height direction of the support plates, and a second transferer transferring the slag removing unit in a length direction of the support plates; and
a controller controlling operation of the slag removal apparatus.

11. The slag removal apparatus according to claim 10, further comprising a position sensing unit including a first sensor sensing a position of the slag removing unit in the length direction.

12. The slag removal apparatus according to claim 11, wherein the second transferer transfers the first transferer in the length direction to move the slag removing unit along with the first transferer in the length direction, and
wherein the first sensor includes a first position sensing bar installed at a predetermined position in the first transferer, and first position sensors installed at predetermined positions in the second transferer, to sense a position of the slag removing unit in the length direction through the first position sensing bar.

13. The slag removal apparatus according to claim 12, wherein one of the first position sensors is installed at a predetermined operation starting point of the support plates in the length direction, and another of the first position sensors is installed at a predetermined operation ending point of the support plates in the length direction.

14. The slag removal apparatus according to claim 13, wherein when the slag removing unit reaches the operation starting point, the controller operates the first transferer to insert each of the support plates to a predetermined first depth in the gap between the blades, and operates the driving member to rotate the blades.

15. The slag removal apparatus according to claim 14, wherein when the slag removing unit reaches the operation ending point, the controller stops the driving member to discontinue the rotation of the blades, and operates the first transferer to withdraw each of the support plates from the gap between the blades.

16. The slag removal apparatus according to claim 14, wherein when the slag removing unit reaches the operation ending point, the controller operates the first transferer to insert each of the support plates to a second depth smaller than the predetermined first depth into the gap between the blades.

17. The slag removal apparatus according to claim 16, wherein the second depth is determined to space the blades from the gap maintaining member by a predetermined gap, when the blades skip the installation position of the gap maintaining member.

18. The slag removal apparatus according to claim 13, wherein one of the first position sensors is installed at a predetermined pass starting point, the pass starting point being spaced from an installation position of a gap maintaining plate positioned to cross the support plates toward the operation starting point by a predetermined distance, and wherein another of the first position sensors is installed at a predetermined pass ending point, the pass ending point being spaced from the installation position of the gap maintaining plate toward the operation ending point by a predetermined distance.

19. The slag removal apparatus according to claim 11, wherein the support plates are installed at a predetermined arrangement gap in a width direction, and wherein a plurality of blades are provided, for simultaneous insertion of each of a predetermined number of support plates among the support plates into a gap between blades belonging to different pairs.

20. The slag removal apparatus according to claim 19, wherein the transfer unit further includes a third transferer transferring the slag removing unit in the width direction.

21. The slag removal apparatus according to claim 20, wherein the third transferer transfers the second transferer in the width direction to move the slag removing unit in the width direction along with the second transferer, and wherein the position sensing unit further includes a second sensor sensing a position of the slag removing unit in the width direction.

22. The slag removal apparatus according to claim 21, wherein the second sensor includes a second position sensing bar installed at a predetermined position in the second transferer, and second position sensors installed at predetermined positions in the third transferer to sense a position of the slag removing unit in the width direction.

23. The slag removal apparatus according to claim 22, wherein each of the second position sensors is installed at one of operation reference points defined at a gap corresponding to the sum of arrangement gaps of the predetermined number of support plates, and wherein when slag is removed from support plates corresponding to one of the operation reference points, the controller transfers the slag removing unit to a position corresponding to another of the operation reference points by operating the third transferer.

\* \* \* \* \*